United States Patent
Nakao

(10) Patent No.: US 9,998,702 B2
(45) Date of Patent: Jun. 12, 2018

(54) IMAGE PROCESSING DEVICE, DEVELOPMENT APPARATUS, IMAGE PROCESSING METHOD, DEVELOPMENT METHOD, IMAGE PROCESSING PROGRAM, DEVELOPMENT PROGRAM AND RAW MOVING IMAGE FORMAT

(71) Applicant: Sony Corporation, Tokyo (JP)

(72) Inventor: Daisuke Nakao, Tokyo (JP)

(73) Assignee: SONY CORPORATION, Tokyo (JP)

( * ) Notice: Subject to any disclaimer, the term of this patent is extended or adjusted under 35 U.S.C. 154(b) by 61 days.

(21) Appl. No.: 14/298,446

(22) Filed: Jun. 6, 2014

(65) Prior Publication Data

US 2014/0355946 A1 Dec. 4, 2014

Related U.S. Application Data

(63) Continuation of application No. 12/172,429, filed on Jul. 14, 2008, now Pat. No. 8,792,774.

(30) Foreign Application Priority Data

Aug. 27, 2007 (JP) .................................. 2007-219980

(51) Int. Cl.
| | |
|---|---|
| G11B 27/00 | (2006.01) |
| H04N 5/93 | (2006.01) |
| H04N 9/80 | (2006.01) |
| H04N 5/77 | (2006.01) |
| H04N 5/232 | (2006.01) |
| G11B 31/00 | (2006.01) |
| H04N 5/765 | (2006.01) |

(Continued)

(52) U.S. Cl.
CPC ........... *H04N 5/772* (2013.01); *G11B 31/006* (2013.01); *H04N 5/232* (2013.01);
(Continued)

(58) Field of Classification Search
USPC .................................. 386/239–248, 278–290
See application file for complete search history.

(56) References Cited

U.S. PATENT DOCUMENTS

6,573,908 B1 6/2003 Jang
7,242,850 B2 7/2007 Cok
(Continued)

FOREIGN PATENT DOCUMENTS

| CN | 1929535 | 3/2007 |
|---|---|---|
| JP | 2005-341551 | 12/2005 |
| JP | 2007-288422 | 11/2007 |

OTHER PUBLICATIONS

Office Action dated Jun. 7, 2011, in Japanese Patent Application No. 2007-219980.

*Primary Examiner* — Hung Dang
(74) *Attorney, Agent, or Firm* — Oblon, McClelland, Maier & Neustadt, L.L.P.

(57) ABSTRACT

An image processing device includes: a parameter generating unit configured to receive supply of raw moving image data which is moving image data in an undeveloped state, and generate a development parameter as to a target frame of the raw moving image data; and a recording control unit configured to perform control so as to record the supplied raw moving image data, and the development parameter generated by the parameter generating unit in a predetermined recording medium in a correlated manner with each other. Thus, raw moving image data which is moving image data before development processing can be suitably employed.

30 Claims, 17 Drawing Sheets

(51) Int. Cl.

| | |
|---|---|
| *H04N 5/775* | (2006.01) |
| *H04N 5/781* | (2006.01) |
| *H04N 5/85* | (2006.01) |
| *H04N 5/907* | (2006.01) |
| *H04N 9/804* | (2006.01) |
| *H04N 9/82* | (2006.01) |

(52) U.S. Cl.
CPC ......... *H04N 5/23254* (2013.01); *H04N 5/765* (2013.01); *H04N 5/775* (2013.01); *H04N 5/781* (2013.01); *H04N 5/85* (2013.01); *H04N 5/907* (2013.01); *H04N 9/8042* (2013.01); *H04N 9/8205* (2013.01); *H04N 9/8227* (2013.01)

(56) References Cited

U.S. PATENT DOCUMENTS

| | | | |
|---|---|---|---|
| 7,612,805 | B2 | 11/2009 | Solomon |
| 8,417,067 | B2 | 4/2013 | Nakao et al. |
| 2002/0152318 | A1 | 10/2002 | Menon et al. |
| 2003/0146915 | A1 | 8/2003 | Brook et al. |
| 2006/0215984 | A1 | 9/2006 | Nesvadba et al. |
| 2007/0052819 | A1 | 3/2007 | Nakao et al. |
| 2007/0132878 | A1 | 6/2007 | Tanaka |
| 2008/0002035 | A1* | 1/2008 | Yoshida ............... G06F 21/10 348/222.1 |
| 2008/0013787 | A1* | 1/2008 | Kobayashi ......... G06K 9/00255 382/103 |
| 2008/0266458 | A1 | 10/2008 | Whittaker |

\* cited by examiner

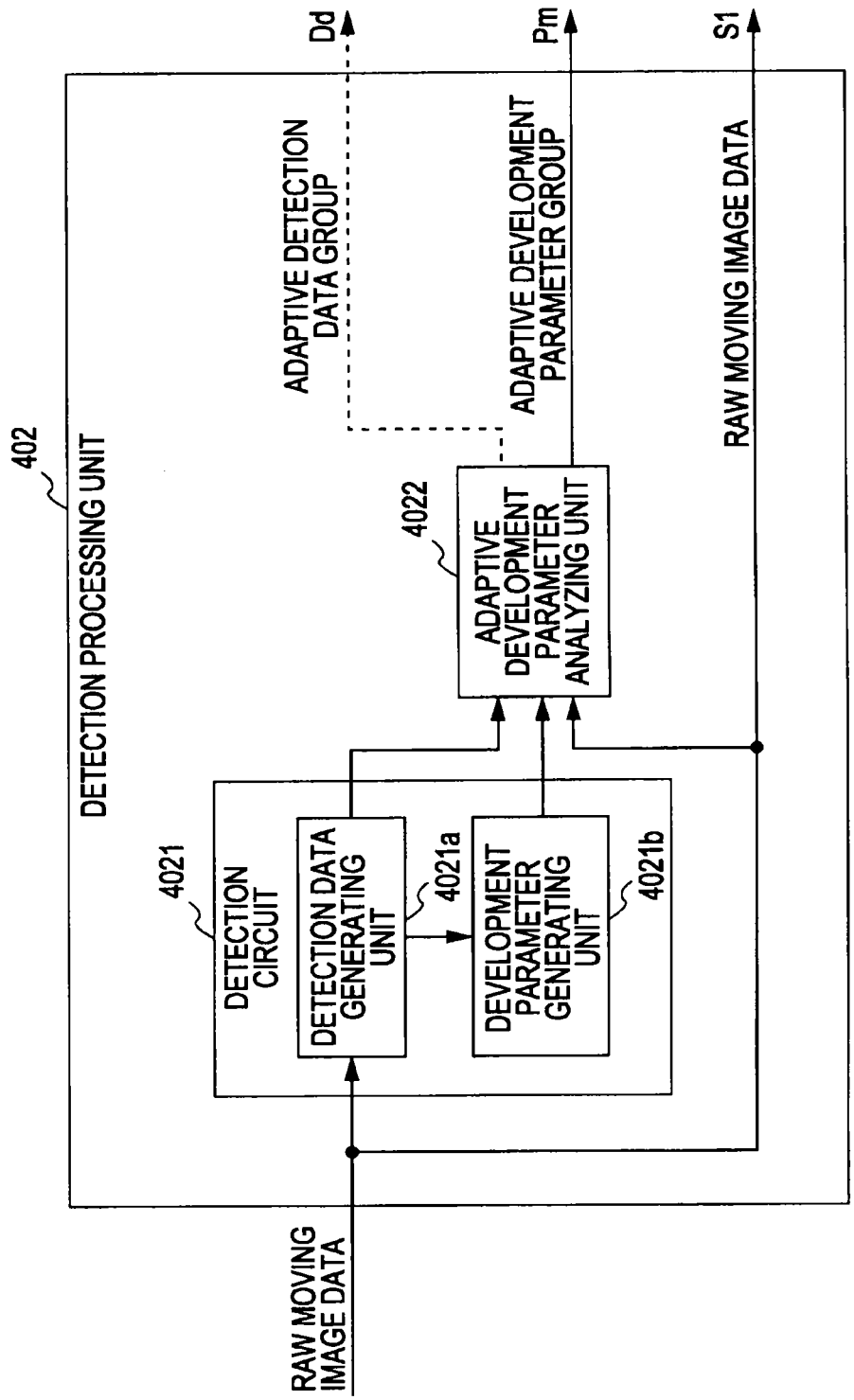

USER ADDS KEY FRAME

SMOOTHED WITH INTERPOLATION

IMAGE PROCESSING DEVICE, DEVELOPMENT APPARATUS, IMAGE PROCESSING METHOD, DEVELOPMENT METHOD, IMAGE PROCESSING PROGRAM, DEVELOPMENT PROGRAM AND RAW MOVING IMAGE FORMAT

CROSS REFERENCES TO RELATED APPLICATIONS

This application is a continuation of U.S. application Ser. No. 12/172,429, filed Jul. 14, 2008, which is based upon and claims the benefit to Japanese Patent Application JP 2007-219980 filed in the Japanese Patent Office on Aug. 27, 2007, the entire contents of each document are incorporated herein by reference.

BACKGROUND OF THE INVENTION

1. Field of the Invention

The present invention relates to a device, method, program, and data format suitable to be employed for processing so-called raw moving image data which is moving image data in undeveloped state.

2. Description of the Related Art

In recent years, raw development has been closely watched wherein a user develops raw image data (still image data) in which the signal of an imaging device was recorded as is while performing development adjustment, from the perspective of convenience thereof. With the raw development processing, the user specifies various development parameters as to a raw development apparatus, whereby a result screen corresponding to the parameter thereof can be obtained.

However, with raw development, the user repeats narrowing-down work of a development parameter. That is to say, as shown in FIG. 21, the raw image data of a target image recorded and held in a raw image file Rd-f is read out (step S1), developed and displayed (step S2), thereby allowing the user to confirm this. Subsequently, development parameter modification instructions are accepted from the user (step S3).

Subsequently, determination is made whether or not there have been modification instructions (step S4), and in a case wherein there have been modification instructions, a development parameter is modified in accordance with the modification instructions accepted in step S3 (step S6), and the processing from step S2 is repeated. Thus, the user repeats development processing while gradually modifying the parameter, confirms the resulting image thereof, and further modifies the parameter based on the results thereof, and accordingly, repeats such work, thereby forming a screen to suit the user's tastes.

The calculation load of the raw development processing itself is generally great, so the calculation load of the entire repeat work described above for narrowing down the development parameter is extremely great, resulting in a great burden on the user in that it takes time and effort before obtaining a target (desired) image. Therefore, the demand for speeding up of the raw development processing has been growing.

One speeding-up technique of the raw development processing has been proposed in Japanese Unexamined Patent Application Publication No. 2005-341551 wherein an intermediate development image is held. With this technique, for example, as shown in FIG. 22, in a case wherein development processing is made up of three processes of processes 1 through 3, a resulting image on the way at a stage wherein the processing of Stage 1 made up of the processes 1 and 2 ends is held as an intermediate development image Cd, and this intermediate development image Cd is held even after Stage 2 made up of the process 3 is executed to generate a resulting image Dd (even after completion of development).

Subsequently, in a case wherein there is no difference between the development parameter specified by the user next time and the parameter necessary for generating the intermediate development image thereof, i.e., in a case wherein there is no need to execute the processes 1 and 2 of Stage 1, only the process 3 of Stage 2 is executed by modifying the parameter using the intermediate development image Cd, thereby enabling repeated development, and consequently, speeding-up of development processing is realized. Thus, high performance can be provided to the user regarding modification of the development parameter as to development processing of intermediate development images and thereafter.

SUMMARY OF THE INVENTION

As described above, various devices have been made regarding use of raw image data as to a still image, and consequently, use of raw image data as to a still image is becoming widespread. Heretofore, raw image recording includes a transmission band problem and so forth, and accordingly, has remained in recording of still images and ultrasonic moving images. On the other hand, with moving image processing as well, there is a great advantage in that development can be performed while adjusting a development parameter such as exposure setting, white balance, or the like.

Therefore, it has been desired that raw image data as to a moving image (moving image data not subjected to development processing), i.e., raw moving image data can also be used. However, moving image data includes a great number of frames worth of image data, and accordingly cannot be conceived simply in the same way as with a case wherein raw image data as to a still image is processed. Specifically, the data quantity of moving image data is greater than that of still image data, so there is a need to record the moving image data effectively.

Also, when taking into consideration suitably developing raw moving image data, there is a need to add a development parameter to all frames of raw moving image data. Note however, at the time of the user's adjustment adding a development parameter to all frames makes it difficult to reflect the user's adjustment on which range.

In other words, in a case wherein a development parameter is added to each frame of raw moving image data, when the user attempts to subject the raw moving image data to development adjustment, there is a need to subject the development parameter of each frame to development adjustment. Even if multiple frames can be adjusted simultaneously, there is a possibility that an adjusted frame and an unadjusted frame are not connected smoothly, resulting in an unnatural moving image.

It has been recognized that there is a need to enable raw moving image data to be employed suitably.

In order to enable raw moving image data to be employed suitably, an image processing device according to an embodiment of the present invention includes: a parameter generating unit configured to receive supply of raw moving image data which is moving image data in an undeveloped state, and generate a development parameter as to a target frame of the raw moving image data; and a recording control unit configured to perform control so as to record the supplied raw moving image data, and the development parameter generated by the parameter generating unit in a predetermined recording medium in a correlated manner with each other.

Here, based on the supplied raw moving image data, a development parameter as to a target frame of the raw moving image data is generated by the parameter generating unit. Subsequently, the supplied raw moving image data and the development parameter generated by the parameter generating unit are recorded in a predetermined recording medium in a correlated manner with each other by the recording control unit.

Note that the term "target frame" mentioned here includes both of the case of being referred to as all frames of the raw moving image data, and the case of being referred to as a predetermined discontinuous frame of the raw moving image data. For example, the term "target frame" mentioned here includes an arrangement wherein, in a case wherein the playback time of raw moving image data is short, a development parameter is generated as to all frames of the raw moving image data, and in a case wherein the playback time of raw moving image data is relatively long, a development parameter is generated as to a predetermined discontinuous frame of the raw moving image data.

Thus, raw moving image data, and a development parameter corresponding to the moving image parameter can be recorded in a predetermined recording medium, thereby enabling the raw moving image data to be used suitably.

The parameter generating unit may generate a development parameter as to a discontinuous frame with a predetermined certain interval of the raw moving image data.

Here, a development parameter can be generated as to a discontinuous frame with a certain interval by the parameter generating unit, for example, such as every one frame, every two frames, and so on.

Thus, a development parameter to be added to the raw moving image data can be suppressed. Subsequently, there are development parameters with a certain interval, thereby enabling the raw moving image data to be used suitably.

The parameter generating unit may include a detection data generating unit configured to generate detection data which is an evaluation value for subjecting the supplied raw moving image data to detection processing, and subjecting the raw moving image data to image processing, in increments of frames, a development parameter generating unit configured to generate a development parameter as to the raw moving image data in increments of frames based on the detection data from the detection data generating unit, and a change point parameter generating unit configured to analyze at least one of the supplied raw moving image data, the detection data from the detection data generating unit, and the development parameter from the development parameter generating unit, and generate a development parameter at a moving image change point according to the raw moving image data.

Here, the parameter generating unit is made up of the detection data generating unit, development parameter generating unit, and change point parameter generating unit. A moving image change point according to the supplied raw moving image data is detected, and a development parameter as to the frame of this change point is generated by the change point parameter generating unit based on the detection data from the detection data generating unit, the development parameter from the development parameter generating unit, and the supplied raw moving image data.

Thus, an essential development parameter is generated as to the supplied raw moving image data, whereby a development parameter to be added to the raw moving image data can be suppressed. A development parameter exists for each moving image change point according to the raw moving image data, thereby enabling the raw moving image data to be used suitably.

The parameter generating unit may change the generation frequency or output frequency of the development parameter depending on whether the development parameter has a high change frequency or a low change frequency.

Here, all development parameters are not generated nor output at the same timing, and generation frequency and output frequency are changed depending on change frequency, by the parameter generating unit. For example, a development parameter of high change frequency is generated and output every N (N is an integer not less than 1) frames, but a development parameter of low change frequency is generated and output every 2N frames.

Thus, a development parameter to be added to the raw moving image data can be suppressed. Also, a development parameter is suitably generated and output as to raw moving image data according to change frequency, thereby enabling raw moving image data to be used suitably.

The parameter generating unit may generate multiple development parameters as to one frame of the raw moving image data.

Here, multiple development parameters can be generated as to one frame of the raw moving image data by the parameter generating unit. For example, according to change frequency, for example, in a case wherein a parameter of high change frequency is added every two frames, and a parameter of low change frequency is added every five frames, the frames of common multiple of these are added with both of a parameter of high change frequency and a parameter of low change frequency.

Thus, necessary development parameters can be suitably generated and added to raw moving image data, thereby enabling raw moving image data to be used suitably.

The image processing device may further include at least one of: a first thumbnail generating unit configured to generate a thumbnail raw moving image data which is reduction image data from the raw moving image data; an intermediate development moving image data generating unit configured to subject the raw moving image data to development processing up to a predetermined stage to generate intermediate development moving image data; a second thumbnail generating unit configured to generate thumbnail intermediate development moving image data which is reduction image data from the intermediate development moving image data generated by the intermediate development moving image data generating unit; an ordinary moving image data generating unit configured to subject the raw moving image data to development to generate developed ordinary moving image data; and a third thumbnail generating unit configured to generate thumbnail ordinary moving image data which is reduction image data from the ordinary moving image data generated by the ordinary moving image data generating unit; with the recording control unit performing control so as to record, in addition to the raw moving image data and the development parameter, the moving image data generated by generating unit provided of the first thumbnail generating unit, the intermediate development moving image data generating unit, the second thumbnail generating unit, the ordinary moving image data generating unit, and the third thumbnail generating unit, in the predetermined recording medium.

Here, there are provided at least one of the first thumbnail generating unit, intermediate development moving image data generating unit, second thumbnail generating unit, ordinary moving image data generating unit, and third thumbnail generating unit, and the data generated by the generating unit provided of these is controlled by the recording control unit along with the raw moving image data and development parameter so as to be recorded in a predetermined recording medium.

Thus, the raw moving image data can be used suitably, and also in addition to the raw moving image data, other data can also be used, such as thumbnail raw moving image data, intermediate development moving image data, thumbnail intermediate development image data, ordinary moving image data, thumbnail ordinary moving image data, and so forth.

Accordingly, if an arrangement is made wherein thumbnail raw moving image data is recorded, thumbnail raw moving image data can be employed from raw moving image data without generating thumbnail raw moving image data, and also if an arrangement is made wherein intermediate development moving image data and thumbnail intermediate development moving image data are recorded, with the intermediate development moving image data as reference, an arrangement can be made such that development processing is repeated while changing a development parameter. Also, if an arrangement is made wherein ordinary moving image data and thumbnail ordinary moving image data are recorded, in a case wherein there is not time to perform development processing, such data is employed, whereby a target image can be employed.

The image processing device may further include: a compression processing unit configured to subject the supplied raw moving image data to data compression processing; with the recording control unit recording the raw moving image data subjected to data compression by the compression processing unit in the predetermined recording medium.

Here, the raw moving image data itself is subjected to data compression by the compression processing unit, and this raw moving image data subjected to data compression can be recorded in a predetermined recording medium by the recording control unit. Note that either a reversible method or an irreversible method can be employed as the data compression method by the compression processing unit.

Thus, the raw moving image data itself can be subjected to data compression and can be recorded in the recording medium, thereby enabling large quantities of raw moving image data to be recorded in the predetermined recording medium effectively, and to be used suitably.

The recording control unit may record the development parameter to which information determining a frame or frame group of the raw moving image data to be applied is arranged to be added, in the predetermined recording medium.

Here, after information indicating whether to correspond to which frame or frame group of the raw moving image data is added to the development parameter, this is recorded in the predetermined recording medium by the recording control unit.

Thus, each frame of the raw moving image data, and the development parameter can be correlated to each other suitably, thereby enabling the raw moving image data to be used suitably.

The image processing device may further include: a reading unit configured to read out the raw moving image data and the development parameter from the predetermined recording medium; a development processing unit configured to subject the raw moving image data read out by the reading unit to development processing up to a predetermined stage or the final stage using the development parameter read out by the reading unit; and an output unit configured to output intermediate development moving image data or ordinary development moving image data processed by the development processing unit.

Here, an arrangement can be made wherein the raw moving image data and development parameter recorded in the predetermined recording medium are read out and employed by the development processing unit, the raw moving image data is subjected to development processing up to a stage on the way or the final stage, and this is output through the output unit.

Thus, the raw moving image data recorded in the predetermined recording medium can be subjected to development processing, and can be used suitably.

Also, the image processing device may further include: a reading unit configured to read out the raw moving image data and the development parameter from the predetermined recording medium; an interpolation processing unit configured to generate a deficient development parameter based on the development parameter read out by the reading unit; a development processing unit configured to subject the raw moving image data read out by the reading unit to development processing up to a predetermined stage or the final stage using a development parameter interpolated and adjusted by the interpolation processing unit; and an output unit configured to output intermediate development moving image data or ordinary development moving image data processed by the development processing unit.

Here, an arrangement can be made wherein the raw moving image data and development parameter recorded in the predetermined recording medium are read out by the reading unit. In a case wherein the read development parameter is recorded in a discontinuous manner, and accordingly, does not exist for each frame, the development parameter is subjected to interpolation processing by the interpolation processing unit, thereby generating a deficient development parameter.

Subsequently, the read raw moving image data and development parameter subjected to the interpolation processing are employed by the development processing unit, the raw moving image data is subjected to the development processing up to a stage on the way or the final stage, and this is output through the output unit.

Thus, even in a case wherein the development parameter is a deficient development parameter, this is suitably subjected to the interpolation processing to interpolate this, thereby enabling the raw moving image data recorded in the predetermined recording medium to be subjected to the development processing and to be used suitably.

Also, the image processing device may further include: a reading unit configured to read out the raw moving image data and the development parameter from the predetermined recording medium; a parameter editing unit configured to subject the development parameter read out by the reading unit to editing in response to input of addition, elimination, and modification instructions of a development parameter from a user; an interpolation processing unit configured to generate a deficient development parameter based on the development parameter edited by the parameter editing unit; a development processing unit configured to subject the raw moving image data read out by the reading unit to development processing up to a predetermined stage or the final stage using a development parameter interpolated and adjusted by the interpolation processing unit; and an output unit configured to output intermediate development moving image data or ordinary development moving image data processed by the development processing unit.

Here, the raw moving image data and development parameter recorded in the predetermined recording medium are read out by the reading unit. Input of addition, elimination, and modification instructions of a development parameter from the user is accepted through the parameter editing unit, and the development parameter is edited according to these.

Subsequently, in a case wherein the edited development parameter does not exist for each frame, this is subjected to the interpolation processing by the interpolation processing unit, thereby generating a deficient development parameter. An arrangement can be made wherein the read raw moving image data and development parameter subjected to the editing processing and interpolation processing are employed by the development processing unit, the raw moving image data is subjected to the development processing up to a stage on the way or the final stage, and this is output through the output unit.

Thus, after the development parameter is subjected to the user's intentional correction, this is subjected to the interpolation processing suitably as necessary to interpolate this, thereby enabling the raw moving image data recorded in the predetermined recording medium to be subjected to the development processing, and to be used suitably.

The image processing device may be configured as an imaging apparatus, further including: an imaging device configured to capture a moving image of a subject, and output raw moving image data which is moving image data in an undeveloped state corresponding thereto.

Here, the image processing device includes an imaging device, whereby the raw moving image data captured through the imaging device can be processed.

Thus, the raw moving image data obtained by applying an present embodiment of the present invention to the image processing device which is configured as an imaging apparatus, and performing shooting, is recorded in the predetermined recording medium suitably, thereby enabling this to be used suitably.

According to an embodiment of the present invention, the environment for the usage of raw moving image data is improved, whereby the raw moving image data to be used suitably and effectively.

BRIEF DESCRIPTION OF THE DRAWINGS

FIG. 5 is a block diagram for describing a configuration example of a detection processing unit of the camera system;

DESCRIPTION OF THE PREFERRED EMBODIMENTS

Description will be made below regarding an embodiment of the present invention. A device, method, and program according to an embodiment of the present invention can be applied to various video cameras (imaging apparatuses) such as noncommercial cameras, business-use cameras, surveillance cameras, and so forth, and imaging apparatuses such as dedicated devices for subjecting raw moving image data to development processing, personal computers, and so forth.

Also, a data format according to an embodiment of the present invention can be applied to a data format including raw moving image data output from an imaging apparatus to which an embodiment of the present invention has been applied to an external device such as a development apparatus connected by cable or wireless, or to a recording medium, or to a wide area network such as the Internet or LAN (Local Area Network), or the like.

With an embodiment described below, in order to simplify description, description will be made regarding a case wherein a device, method, and program according to an embodiment of the present invention have been applied to a camera system (imaging apparatus) capable of moving image shooting, as an example. Also, description will be made regarding a case wherein a data format according to an embodiment of the present invention has been applied to a data format including raw moving image data output from the camera system, as an example.

Configuration Example of Camera System

Figure 1:
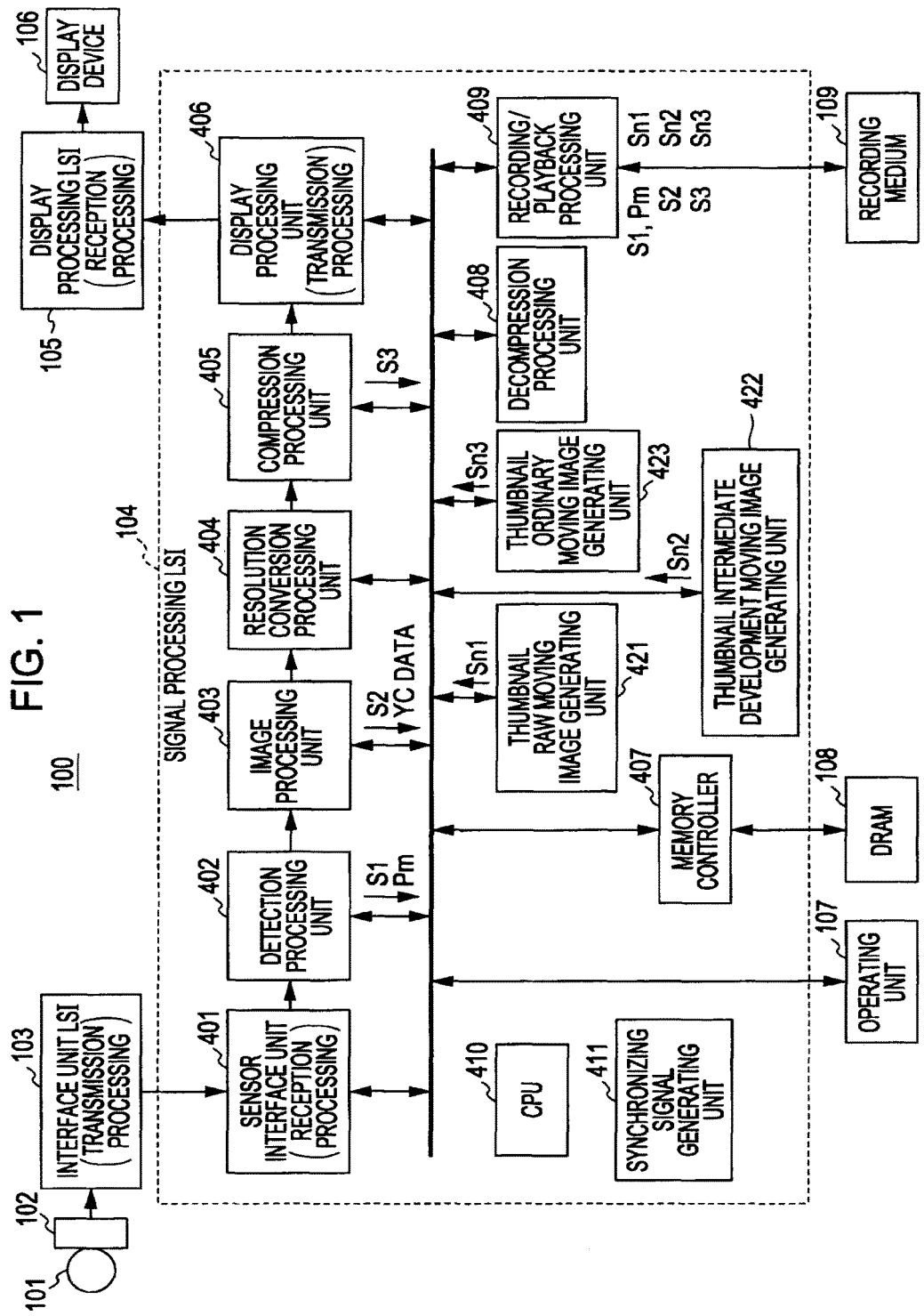
FIG. 1 is a block diagram for describing a camera system to which an embodiment of the present invention has been applied.

FIG. 1 is a block diagram for describing a camera system according to the present embodiment. As shown in FIG. 1, if a camera system 100 according to the present embodiment is roughly divided, this camera system includes a lens unit 101, imaging device unit 102, interface unit LSI 103, signal processing LSI 104, display processing LSI 105, and display device 106, and also, the signal processing LSI 104 is connected with an operating unit 107, general-purpose DRAM 108, and recording medium 109.

Now, the operating unit 107 includes a recording standby key, recording start key, recording stop key, telescopic adjustment key, other various types of adjustment keys, function keys, and so forth, and in response to operating input from a user, can convert the operating input into an electric signal to supply this to the signal processing LSI 104. The DRAM 108 is so-called volatile memory, and is principally employed as a work area, such as storing the result on the way of various processing temporarily.

The recording medium 109 is a principal recording medium with the camera system 100 according to the present embodiment, and examples of this include built-in semiconductor memory, detachable memory card employing semiconductor memory, and a small hard disk. With the camera system 100 according to the present embodiment, the recording medium 109 is, for example, a detachable memory card.

The signal processing LSI 104 includes, as shown in FIG. 1, a sensor interface unit 401, detection processing unit 402, image processing unit 403, resolution conversion processing unit 404, compression processing unit 405, display processing unit 406, memory controller 407, decompression processing unit 408, recording playback processing unit 409, CPU 410, synchronizing signal generating unit 411, thumbnail raw moving image generating unit 421, thumbnail intermediate development image generating unit 422, and thumbnail ordinary moving image generating unit 423.

The respective units making up the signal processing LSI 104 are connected through a common bus as shown in FIG. 1, and exchange of data between the respective processing units is basically performed through the common bus. However, there is a case wherein data is exchanged directly between the respective processing units without passing through the bus. In a case wherein data is exchanged directly between the respective processing units without passing through the bus, this can also be regarded as one processing unit.

Also, the CPU 410 provided within the signal processing LSI 104 controls the respective units within the signal processing LSI 104. Note that ROM in which data necessary for various types of processing circuits and processing is recorded beforehand is provided within the signal processing LSI 104, though not shown in the drawing. The CPU 410 reads out and executes a necessary program from the ROM, generates a control signal to be supplied to the respective units to supply this to the respective units, or receives a signal from the respective units to perform processing corresponding to this.

Also, the synchronizing signal generating unit 411 generates various types of timing signal, for example, such as a frame start reference signal VD, line start reference signal HD, and so forth, to supply this to the necessary respective units within the signal processing LSI 104.

Thus, there are multiple processing units by function within each LSI making up the camera system 100. The configuration shown in FIG. 1 is an example thereof, and of course, there is a case wherein the processing units within each LSI shown in FIG. 1 are arranged to belong to another LSI, depending on design concept. The number of processing units making up each LSI, and the function of each LSI vary depending on a purpose.

With the camera system 100 according to the present embodiment, developed moving image data for display obtained by performing shooting and development processing can be subjected to data compression processing to record this in the recording medium 109 as ordinary moving image data in a conventional manner, and also, ordinary moving image data recorded in the recording medium 109 can be read out and subjected to data decompression processing to play this.

Further, though the details will be described later, the camera system 100 according to the present embodiment can record raw moving image data before development processing obtained by shooting, and development parameter in the recording medium 109, and also can read out the raw moving image data and development parameter recorded in the recording medium 109, perform development processing upon this, and play this. Note that the camera system 100 according to the present embodiment allows the user to adjust a development parameter.

Also, though the details will be described later, the camera system 100 according to the present embodiment can generate intermediate development moving image data by subjecting the raw moving image data before development processing obtained by shooting to development processing up to the middle (predetermined process) to record this in the recording medium 109, and also can read out the intermediate development moving image data recorded in the recording medium 109, perform unprocessed worth of development processing upon this as necessary, and play this.

In this case as well, the development parameter to be recorded in the recording medium is employed, and the user may adjust this. In the case of intermediate development moving image data, development processing on the way has been completed, unless the completed development processing parameter is modified, the adjustment of the development parameter regarding the development processing of the unprocessed portion is performed using the intermediate development moving image data any number of times, whereby development processing can be performed repeatedly.

Also, as described above, thumbnail moving image data as to ordinary moving image data (thumbnail ordinary moving image data), thumbnail moving image data as to raw moving image data (thumbnail raw moving image data), and thumbnail moving image data as to intermediate development moving image data are generated, and also recorded in the recording medium 109, whereby these can also be read out and used later.

Note that with the camera system according to the present embodiment, a shooting mode can be provided wherein only the target moving image data is available and recordable in the recording medium 109, for example, such as a shooting mode for recording only ordinary moving image data in the recording medium 109, shooting mode for recording raw moving image data and development parameter in the recording medium 109, and shooting mode for recording intermediate development moving image data and development parameter in the recording medium 109.

However, the important features of the camera system according to the present embodiment are in that the user is allowed to use raw moving image data, which has been unavailable in a conventional manner, i.e., at least raw moving image data and development parameter are recorded in the recording medium 109, and further in response to instructions from the user, at least one data selected from thumbnail raw moving image data, intermediate development moving image data, thumbnail intermediate development moving image data, ordinary moving image data, and thumbnail ordinary moving image data can be recorded in the recording medium 109.

Operation at the Time of Shooting

Next, description will be made regarding the operation at the time of shooting of the camera system 100 according to the present embodiment. Now, description will be made regarding a case wherein, in addition to raw moving image data and development parameter, thumbnail raw moving image data, intermediate development moving image data, thumbnail intermediate development moving image data, ordinary moving image data, and thumbnail ordinary moving image data are recorded in the recording medium 109.

The image of a subject imaged on the imaged face of the imaging device of the imaging device unit 102 through the lens unit 101 is converted into an electric signal (analog image signal) by the imaging device, and supplied to the interface unit LSI 103. The interface unit LSI 103 forms data (raw moving image data) S1 having a format to be supplied to the signal processing LSI 104 by converting the analog moving image signal supplied thereto into a digital signal, or the like, and supplies this to the signal processing LSI 104.

The raw moving image data S1 from the interface unit LSI 103 is accepted by the sensor interface unit 401 of the signal processing LSI 104, and supplied to the detection processing unit 402. The detection processing unit 402 generates a group of development parameters (development parameter group) Pm for various types of image processing to be performed at the subsequent stages, such as a parameter for exposure adjustment processing, a parameter for white balance adjustment processing, and so forth, based on the supplied raw moving image data S1, and supplies the generated development parameter group Pm, and raw moving image data S1 to the image processing unit 403.

Also, the raw moving image data S1 and development parameter group Pm output from the detection processing unit 402 are recorded in the recording medium 109 through the recording/playback processing unit 409, and also the raw moving image data S1 is also supplied to the thumbnail raw moving image generating unit 421, where the raw moving image data S1 is also employed for generating thumbnail raw moving image data Sn1.

The image processing unit 403 subjects the raw moving image data S1 from the detection processing unit 402 to exposure adjustment processing, white balance adjustment processing, NR (Noise Reduction) processing, and interpolation processing (demosaic processing) in accordance with the development parameter group Pm from the detection processing unit 402 to generate and output intermediate development moving image data S2, and also subjects the intermediate development moving image data S2 to further other development processing (saturation adjustment processing and color tone adjustment processing) to ultimately generate and output YC data (color difference data). Note that with the image processing unit 403, YC data can be subjected to edge enhancement processing called aperture compensation processing or noise reduction processing or the like as necessary.

The intermediate development moving image data S2 generated at the image processing unit 403 is recorded in the recording medium 109 through the recording/playback processing unit 409, and also supplied to the thumbnail intermediate development moving image generating unit 422, where the intermediate development moving image data S2 is also employed for generating thumbnail intermediate development moving image data Sn2. Also, the YC data ultimately generated at the image processing unit 403 is supplied to the resolution conversion processing unit 404.

The resolution conversion processing unit 404 forms moving image data for display by subjecting the YC data supplied thereto to image scaling processing, supplies this moving image data for display to the compressing processing unit 405 and display processing unit 406, and also supplies this moving image data for display to the thumbnail ordinary moving image generating unit 423, where this moving image data for display is also employed for generating thumbnail ordinary moving image data Sn3.

The compression processing unit 405 subjects the moving image data for display supplied thereto to data compression processing using a predetermined compression method (e.g., MPEG method) to generate ordinary moving image data S3 for recording. The ordinary moving image data S3 for recording generated at the compression processing unit 405 is recorded in the recording medium 109 through the recording/playback processing unit 409.

On the other hand, the display processing unit 406 forms moving image data for display having a format to be supplied to the display processing LSI 105, and supplies this to the display processing LSI 105. The display processing LSI 105 interprets the moving image data from the display processing unit 406 of the signal processing LSI 104 in accordance with the format, forms a moving image signal to be supplied to the display device 106 such as a liquid crystal panel, and supplies this to the display device 106.

The display device 106 includes a display device such as a liquid crystal panel as described above, accepts the image signal from the display processing LSI 105, supplies this to its own display device, thereby enabling the moving image corresponding to the supplied moving image signal to be displayed on the display screen of its own display device.

The thumbnail raw moving image generating unit 421 generates and outputs thumbnail raw moving image data Sn1 from the raw moving image data S1 supplied thereto. Also, the thumbnail intermediate development moving image generating unit 422 generates and outputs thumbnail intermediate development moving image data Sn2 from the intermediate development moving image data S2 supplied thereto. Also, the thumbnail ordinary moving image generating unit 423 generates and outputs thumbnail ordinary moving image data Sn3 from the image data for display (ordinary moving image data before compression processing) supplied thereto, subjected to development processing, and formed.

Each of the generated thumbnail raw moving image data Sn1, thumbnail intermediate development moving image data Sn2, and thumbnail ordinary moving image data Sn3 is recorded in the recording medium 109 through the recording/playback processing unit 409.

Note that processing employing the DRAM 108 has not been described here to simplify description, but processing employing the DRAM 108 is such that the above-mentioned respective units employ the DRAM 108 as a work area through the memory controller 407 as necessary, temporarily store the result of the processing on the way, e.g., generated image data at each stage in the DRAM, and the processing unit having a need for this reads out and uses this.

Thus, the camera system 100 according to the present embodiment allows the user to display the moving image of a subject captured through the lens unit 101 and imaging device unit 102 on the display screen of the display device 106, to shoot the moving image of the subject while confirming the display screen, and, as described above, to record the raw moving image data S1, intermediate development moving image data S2, ordinary moving image data S3, thumbnail raw moving image data Sn1, thumbnail intermediate development moving image Sn2, thumbnail ordinary moving image data Sn3, and development parameter group Pm in the recording medium 109.

Note that description has been made here assuming that the raw moving image data S1, intermediate development moving image data S2, thumbnail raw moving image data Sn1, thumbnail intermediate development moving image Sn2, and thumbnail ordinary moving image data Sn3 are each recorded as is in the recording medium 109 without performing data compression.

However, the present invention is not restricted to this. The raw moving image data S1 is moving image data before development processing, so the data quantity thereof is extremely great. Therefore, for example, an arrangement may be made wherein the raw moving image data S1 is subjected to data compression processing in accordance with a predetermined compression method using the function of the compression processing unit 405 shown in FIG. 1, following which is recorded in the recording medium 109. Various compression methods may be employed as the compression method employed in this case, and accordingly, either a reversible method or an irreversible method may be employed.

Similarly, an arrangement may be made wherein the intermediate development moving image data S2, thumbnail raw moving image data Sn1, thumbnail intermediate development moving image Sn2, and thumbnail ordinary moving image data Sn3 are each subjected to data compression processing in accordance with a predetermined compression method using the function of the compression processing unit 405 shown in FIG. 1, following which are recorded in the recording medium 109. Various compression methods may be employed as the compression method employed in this case, and accordingly, either a reversible method or an irreversible method may be employed.

Thus, the raw moving image data S1, intermediate development moving image data S2, thumbnail raw moving image data Sn1, thumbnail intermediate development moving image Sn2, and thumbnail ordinary moving image data Sn3 are also subjected to data compression processing, and recorded in the recording medium 109, whereby large quantities of image data can be recorded effectively in the recording medium 109 of which the storage capacity is limited.

It goes without saying that an arrangement may be made wherein one or both of the raw moving image data S1, and intermediate development moving image data S2, which have large quantities of data, are subjected to data compression, and then recorded in the recording medium 109, but the other data, i.e., the thumbnail raw moving image data Sn1, thumbnail intermediate development moving image Sn2, and thumbnail ordinary moving image data Sn3 are recorded in the recording medium 109 without being subjected to data compression. Also, the user himself/herself may specify data to be subjected to data compression, and data to be subjected to no data compression.

Operation at the Time of Playback

Subsequently, each of the raw moving image data S1, intermediate development moving image data S2, ordinary moving image data S3, thumbnail raw moving image data Sn1, thumbnail intermediate development moving image Sn2, and thumbnail ordinary moving image data Sn3 recorded in the recording medium 109 can be played in response to input of playback instructions from the user which are accepted through the operating unit 107. Now, description will be made assuming that only the ordinary moving image data S3 is subjected to data compression, and recorded in the recording medium 109.

Upon playback of the ordinary moving image data S3 recorded in the recording medium 109 being instructed through the operating unit 107, the CPU 110 controls the recording/playback processing unit 409 to read out the ordinary moving image data S3 of which the playback has been instructed subjected to data compression and recorded therein from the recording medium 109, and supply this to the decompression processing unit 408.

The decompression processing unit 408 subjects the ordinary moving image data S3 supplied thereto and subjected to data compression to decompression processing, restores the original moving image data for display before data compression, and supplies this to the display processing unit 406. As described above, the display processing unit 406 forms moving image data for display having a format to be supplied to the display processing LSI 105 from the moving image data for display supplied thereto, and supplies this to the display processing LSI 105.

As described above, the display processing LSI 105 interprets the moving image data from the display processing unit 406 of the signal processing LSI 104 in accordance with the format, forms a moving image signal to be supplied to the display device 106, and supplies this to the display device 106. Thus, with the display device 106, the moving image corresponding to the supplied moving image signal can be displayed on the display screen of its own display device.

Also, upon playback of the thumbnail ordinary moving image data Sn3 recorded in the recording medium 109 being instructed through the operating unit 107, the CPU 110 controls the recording/playback processing unit 409 to read out the thumbnail ordinary moving image data Sn3 of which the playback has been instructed, recorded therein from the recording medium 109, and supplies this to the display processing unit 406. The display processing unit 406 forms thumbnail moving image data for display having a format to be supplied to the display processing LSI 105, and supplies this to the display processing LSI 105.

As described above, the display processing LSI 105 interprets the thumbnail image data from the display processing unit 406 of the signal processing LSI 104 in accordance with the format, forms a thumbnail moving image signal to be supplied to the display device 106, and supplies this to the display device 106. Thus, with the display device 106, the thumbnail moving image corresponding to the supplied thumbnail moving image signal can be displayed on the display screen of its own display device.

Also, upon the playback of the intermediate development moving image data S2 recorded in the recording medium 109 being instructed through the operating unit 107, the CPU 110 controls the recording/playback processing unit 409 to read out the intermediate development moving image data S2 of which the playback has been instructed and the development parameter group Pm, recorded therein from the recording medium 109, and supplies this to the image processing unit 403.

The image processing unit 403 subjects the supplied intermediate moving image data S2 to remaining development processing using the supplied development parameter group Pm to generate YC data. Note that, at this time, in the case of accepting input of development parameter modification instructions from the user through the operating unit 107, an arrangement may be made wherein with regard to the remaining development processing, the information of the development parameter group is modified corresponding to input of the modification instructions thereof, development processing is performed using the development parameter after the modification thereof.

Thus, in the case of the camera system 100 according to the present embodiment, the intermediate development moving image data S2 is arranged to be recorded and held in the recording medium 109, so development processing on the way can be repeated any number of times by employing the intermediate development moving image data S2. That is to say, even if the development parameter regarding the remaining development processing is modified, development processing can be prevented from being restarted from the beginning, whereby the development processing can be rapidly carried out.

In the case of YC data having been generated at the image processing unit 403, the YC data is supplied to the display processing unit 406 as described above, where the display processing unit 406 forms moving image data for display having a format to be supplied to the display processing LSI 105, and supplies this to the display processing LSI 105. As described above, the display processing LSI 105 interprets the moving image data for display from the display processing unit 406 of the signal processing LSI 104 in accordance with the format, forms a moving image signal to be supplied to the display device 106, and supplies this to the display device 106.

Thus, with the display device 106, the moving image corresponding to the supplied moving image signal can be displayed on the display screen of its own display device. Note that in a case wherein the thumbnail intermediate development moving image data Sn2 having been instructed so as to be played, similar to the case of the intermediate development moving image data S2 described above, the thumbnail intermediate development moving image data Sn2 and development parameter Pm are supplied to the image processing unit 403, where the remaining development processing is carried out, and thumbnail YC data is formed.

The thumbnail YC data formed at the image processing unit 403 is converted into a thumbnail moving image signal having a format to be supplied to the display device 106 through the display processing unit 406 and display processing LSI 105, this signal is supplied to the display device 106, and the thumbnail moving image corresponding to the thumbnail moving image signal obtained by subjecting the thumbnail intermediate development moving image data to development processing is displayed on the display screen of the display device 106.

Note that in the case of performing the playback processing of the thumbnail intermediate development moving image data Sn2 as well, in the case of accepting input of the development parameter modification instructions regarding the remaining development processing, the remaining development processing can be carried out by modifying the development parameter according to input of the modification instructions.

Also, upon the playback of the raw moving image data S1 recorded in the recording medium 109 being instructed through the operating unit 107, the CPU 110 controls the recording/playback processing unit 409 to read out the raw moving image data S1 of which the playback has been instructed and the development parameter group Pm, recorded therein from the recording medium 109, and supplies this to the image processing unit 403.

The image processing unit 403 subjects the supplied raw moving image data S1 to development processing using the supplied development parameter group Pm. In this case, unlike the above-mentioned case of subjecting the intermediate development moving image data to development processing, the development processing is arranged to be performed from the beginning thereof. That is to say, the image processing unit 403 subjects the supplied raw moving image data S1 to exposure/white balance adjustment processing, interpolation processing (demosaic processing), and other development processing (e.g., aperture compensation processing, noise reduction processing, etc.) to generate and output YC data.

Note that, at this time, in the case of accepting input of development parameter group modification instructions from the user through the operating unit 107, an arrangement may be made wherein the information of the development parameter group is modified corresponding to input of the modification instructions thereof, development processing is performed using the development parameter group after the modification thereof. In this case, development processing can be carried out from the beginning, whereby the modification of basic development parameter can be performed, such as exposure adjustment or white balance adjustment, and accordingly, a moving image having characteristics desired by the user can be formed by adjusting the development parameter finely.

The thumbnail YC data formed at the image processing unit 403 is converted into a moving image signal having a format to be supplied to the display device 106 through the display processing unit 406 and display processing LSI 105, this signal is supplied to the display device 106, and the moving image corresponding to the moving image signal obtained by subjecting the raw moving image data S1 to development processing is displayed on the display screen of the display device 106.

Note that in the case of the thumbnail raw moving image data Sn1 being instructed to be played as well, similar to the case of the raw moving image data S1 described above, the thumbnail raw moving image data Sn1 and development parameter group Pm are supplied to the image processing unit 403, where the raw moving image data Sn1 is subjected to development processing, and thumbnail YC data is formed.

The thumbnail YC data formed at the image processing unit 403 is converted into a thumbnail moving image signal having a format to be supplied to the display device 106 through the display processing unit 406 and display processing LSI 105, this signal is supplied to the display device 106, and the thumbnail moving image corresponding to the thumbnail moving image signal obtained by subjecting the thumbnail raw moving image data to development processing is displayed on the display screen of the display device 106.

Note that in the case of performing the playback processing of the thumbnail raw moving image data Sn1 as well, in the case of accepting input of the development parameter modification instructions regarding development processing, the development processing can be carried out by modifying the development parameter according to input of the modification instructions.

Description has been made here regarding the case of playing each type of moving image data recorded in the recording medium 109, but moving image data subjected to development processing can also be recorded in the recording medium 109. For example, an arrangement may be made wherein the moving image data for display obtained, as described above, by subjecting raw moving image data S1 or intermediate development moving image data S2 is subjected to data compression at the compression processing unit 405, and is recorded in the recording medium 109 instead of or along with the ordinary moving image data S3.

Also, an arrangement may be made wherein the thumbnail moving image data for display obtained, as described above, by subjecting thumbnail raw moving image data Sn1 or thumbnail intermediate development moving image data Sn2 is recorded in the recording medium 109 instead of or along with the thumbnail ordinary moving image data Sn3.

Also, though not shown in the drawing, the camera system according to the present embodiment includes a digital interface serving as a connection terminal unit with an external device, whereby various types of data recorded in the recording medium 109 can be output through the digital interface, or various data obtained from an external device through the digital interface can be recorded in the recording medium 109.

Also, the camera system according to the present embodiment includes a communication unit for connecting to a wide area network such as the Internet or a communication unit for connecting to the LAN or the like, whereby various types of data recorded in the recording medium 109 can be output through the communication unit or various types of data obtained from an external device through the communication unit can be recorded in the recording medium 109.

Also, with the camera system according to the present embodiment, moving image data regarding a moving image being played can be monitored through an external monitor receiver by outputting this through an unshown picture output terminal.

Thus, with the camera system 100 according to the present embodiment, the raw moving image data S1, intermediate development moving image data S2, ordinary moving image data S3, thumbnail raw moving image data Sn1, thumbnail intermediate development moving image Sn2, thumbnail ordinary moving image data Sn3, and development parameter group Pm can be obtained by shooting a moving image, and recorded in the recording medium 109, and also the raw moving image data S1, intermediate development moving image data S2, ordinary moving image data S3, thumbnail raw moving image data Sn1, thumbnail intermediate development moving image Sn2, and thumbnail ordinary moving image data Sn3 recorded in the recording medium 109 can be played and used.

Note that in a case wherein the raw moving image data S1, intermediate development moving image data S2, thumbnail raw moving image data Sn1, thumbnail intermediate development moving image Sn2, and thumbnail ordinary moving image data Sn3 have been subjected to data compression and recorded in the recording medium 109, such data is subjected to decompression processing at the decompression processing unit 408, and then supplied to the image processing unit 404 or display processing unit 406. Also, basically, such data is not subjected to data compression like moving image data, so is supplied to the image processing unit 403 as is.

Raw Moving Image Format

Figure 2:
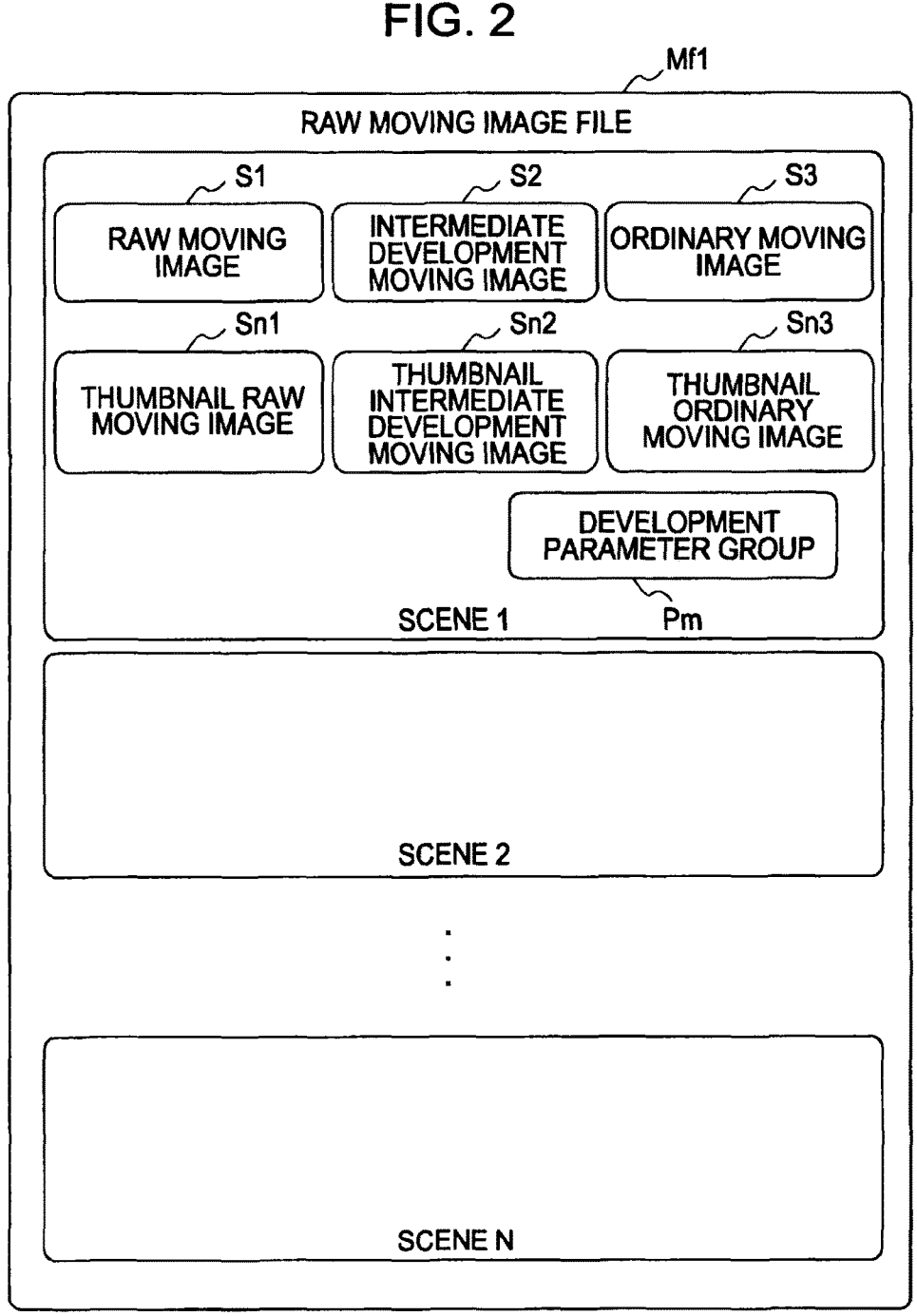
FIG. 2 is a diagram for describing a raw moving image format employed for a camera system 100 shown in FIG. 1.

Next, description will be made regarding a data format (raw moving image format) in a case wherein with the camera system 100 according to the present embodiment, moving image data including raw moving image data is recorded or transmitted. FIG. 2 is a diagram for describing a raw moving image format which is a data format arranged to include raw moving image data which is recorded in the recording medium 109, or output through an unshown digital interface or communication unit with the camera system 100 shown in FIG. 1.

As shown in FIG. 1, one raw moving image file Mf1 is divided into multiple scenes, such as scene 1, scene 2, and so on through scene N, there is provided a single or multiple raw moving image formats as to one scene. The raw moving image format mentioned here means the group format of a series of data made up of:

(1) Raw moving image data S1
(2) Thumbnail raw moving image data Sn1
(3) Intermediate development moving image data S2 of raw moving image data
(4) Thumbnail intermediate development moving image Sn2
(5) Developed ordinary moving image data S3
(6) Thumbnail ordinary moving image data Sn3
(7) Development parameter group Pm As described above, the raw moving image data S1 is moving image data before development processing obtained by shooting. Also, the thumbnail raw moving image data Sn1 is raw moving image data obtained by reducing the raw moving image data S1 suitably. Note that according to the function of the thumbnail raw moving image generating unit 421 shown in FIG. 1, a plurality of thumbnail moving image data having a different size can be generated and held.

Note that the amount of data of thumbnail raw moving image data is smaller than that of raw moving image data, so in the case of modifying the information of a development parameter group, performing development processing rapidly, and viewing the results thereof, it is effective to employ thumbnail raw moving image data.

As described above, the intermediate development moving image data S2 is moving image data obtained by subjecting the raw moving image data S1 to development processing up to the middle. With the camera system 100 according to the present embodiment, only the exposure adjustment processing, white balance adjustment processing, NR processing, and demosaic processing are performed, but the subsequent saturation adjustment and color tone adjustment processing are not performed.

This is but an example, and it goes without saying that the moving image data subjected to development processing up to a certain stage can be employed as intermediate development moving image data. There is a case wherein development processing can be performed from the middle by employing the intermediate development moving image data S2, and in this case, development processing can be performed at high speed.

Also, the thumbnail intermediate development moving image data Sn2 is intermediate development moving image data obtained by reducing the intermediate development moving image data S2 suitably. Note that according to the function of the thumbnail intermediate development moving image generating unit 422 shown in FIG. 1, a plurality of thumbnail intermediate development moving image data having a different size can be generated and held.

Also, according to the performance of the camera system 100, as the function of the thumbnail intermediate development moving image generating unit 422, for example, an arrangement may be made wherein a plurality of intermediate development moving image data of different development processing stages are generated, such as first intermediate development moving image data whereby a first stage of development processing has been completed, and second intermediate development moving image data whereby a second stage of development processing has been completed, or one type of intermediate development moving image data is generated whereby a target development stage of development processing has been completed in accordance with the specification of the user.

Particularly, in the case of employing the thumbnail intermediate development moving image data Sn2, a thumbnail image (reduction image) is subjected to development processing, so the amount of data to be processed is extremely reduced, and accordingly, an advantage of improvement in developing velocity is high. That is to say, the thumbnail intermediate development moving image data Sn2 is subjected to development processing by the user adjusting the development parameter, whereby the development processing can be performed rapidly, and the user can confirm rapidly whether or not desired target development processing has been performed.

Also, as described above, the ordinary moving image data S3 is moving image data obtained by subjecting raw moving image data to development processing and data compression, and with the camera system according to the related art, this ordinary moving image data S3 has been data to be recorded in a recording medium. Also, the thumbnail ordinary moving image data Sn3 is moving image data obtained by suitably reducing moving image data for display formed by subjecting raw image data to development processing. Note that according to the function of the thumbnail ordinary moving image generating unit 423 shown in FIG. 1, a plurality of thumbnail ordinary moving image data having a different size can be generated and held.

The ordinary moving image data S3 and thumbnail Sn3 have already been subjected to development processing, so there is no need to perform development processing, which are suitable for a case wherein the content of moving image data obtained by shooting is rapidly played and confirmed regardless of image quality or the like.

As shown in FIG. 2, the raw moving image data S1, intermediate development moving image data S2, ordinary moving image data S3, thumbnail raw moving image data Sn1, thumbnail intermediate development moving image Sn2, thumbnail ordinary moving image data Sn3, and development parameter group Pm are held for each scene of a series of moving image data, whereby these can be used properly depending on a purpose.

For example, in the case of immediately playing and viewing a shot moving image, the ordinary moving image data S3 needs to be played and viewed, and also, in the case of searching target moving image data from plurality of moving image data, the thumbnail ordinary moving image data Sn3 regarding each moving image data needs to be played.

Also, in the case of adjusting the development parameter to be employed regarding the development processing after the intermediate development moving image data S2 was generated, the intermediate development moving image data S2 needs to be played, and in the case of knowing the results of the development processing from the middle thereof early, the development parameter needs to be adjusted so as to play the thumbnail intermediate development moving image data Sn2.

In the case of adjusting moving image data obtained by shooting so as to obtain the user's desired image quality, the development parameter needs to be adjusted so as to play the raw moving image data S1, and in the case of knowing the result thereof early, the development parameter needs to be adjusted so as to play the thumbnail raw moving image data. The thumbnail raw moving image data Sn3 is employed, whereby the amount of image data to be processed can be narrowed down, development processing can be performed rapidly using the development parameter according to the user's instructions, and the result thereof can be viewed.

Note that, in the case of the format shown in FIG. 2, description has been made assuming that each moving image data S1, S2, S3, Sn1, Sn2, and Sn3, and development parameter Pm are held for each scene of a moving image. The parameter group mentioned here is made up of multiple parameter groups corresponding to each target frame of the scene. In order to hold data for each scene, there is a need to detect scene change points of a moving image.

Various types of method having been employed heretofore can be employed for detection of scene change points (scene change positions). For example, a case wherein the difference of the pixel values between adjacent frames is equal to or greater than a predetermined value can be regarded as a scene change point. In this case, various types of correspondence can be taken, such as employing the pixels of the whole frame, employing the pixels of predetermined multiple positions, employing only brightness data, taking color data into consideration as well, or the like. Also, though the details will be described later, scene change points can also be detected by taking detection data for each frame and change in a development parameter into consideration.

Another Example of Raw Moving Image Format

Figure 3:
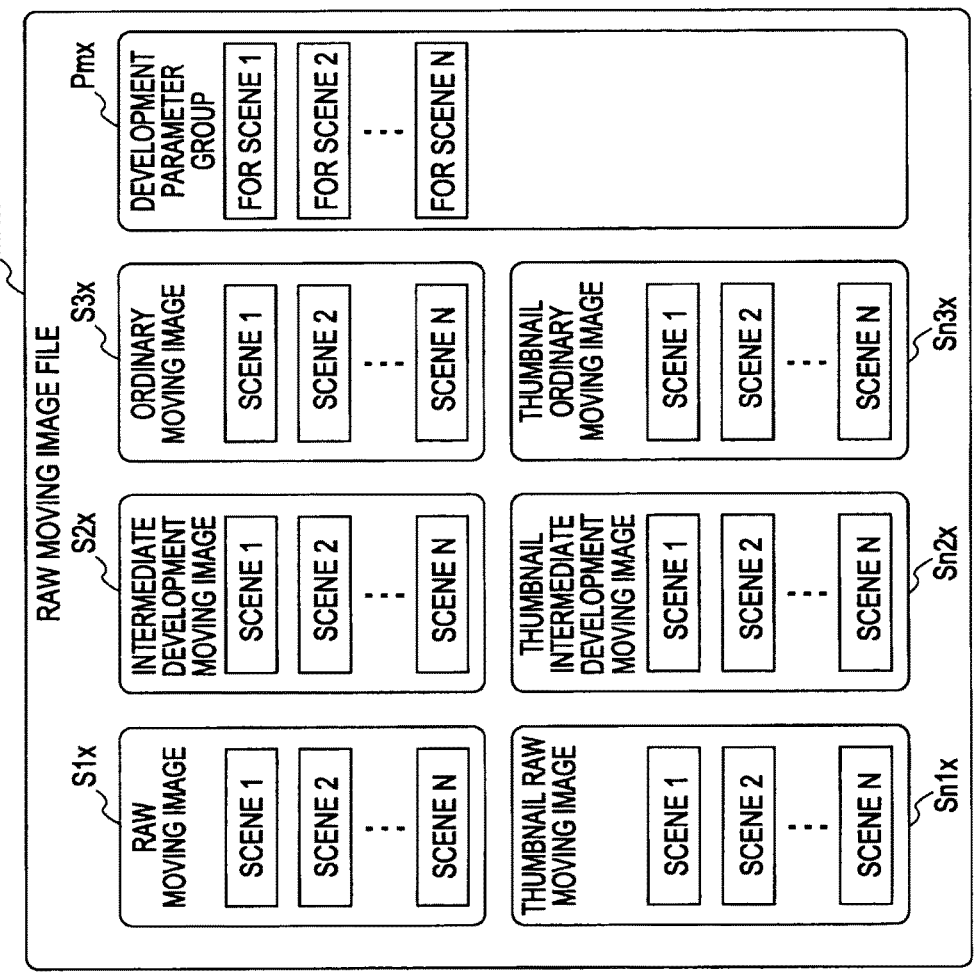
FIG. 3 is a diagram for describing another example of a raw moving image format.

Also, as shown in FIG. 2, an arrangement may be made wherein a plurality of moving image data including the raw moving image data S1 and development parameter group Pm are not collected for each scene, but scenes are collected and held for each data of a different format or type. FIG. 3 is a diagram for describing another example of the raw moving image format.

In the case of another example of the raw moving image format shown in FIG. 3 as well, similar to the case of the raw moving image format shown in FIG. 2, data to be held includes the raw moving image data S1, intermediate development moving image data S2, ordinary moving image data S3, thumbnail raw moving image data Sn1, thumbnail intermediate development moving image Sn2, thumbnail ordinary moving image data Sn3, and development parameter group Pm.

However, in the case of the example shown in FIG. 3, the respective scenes of a series of moving images are collected for each data of a different format. That is to say, raw moving image data S1$x$ is raw moving image data collected for each scene. Also, intermediate development moving image data S2$x$ is intermediate development moving image data collected for each scene. Also, ordinary moving image data S3$x$ is ordinary moving image data collected for each scene.

Similarly, thumbnail raw moving image data Sn1$x$ is thumbnail raw moving image data collected for each scene. Also, thumbnail intermediate development moving image data Sn2$x$ is thumbnail intermediate development moving image data collected for each scene. Also, thumbnail ordinary moving image data Sn3$x$ is thumbnail ordinary moving image data collected for each scene. Also, a development parameter group Pm$x$ is development parameter groups collected for each scene.

In the case of the raw moving image format shown in FIG. 2, moving image data of a different format and development parameter groups are collected in increments of scenes, but in the case of the raw moving image format shown in FIG. 3, each of the raw moving image data S1$x$, intermediate development moving image data S2$x$, ordinary moving image data S3$x$, thumbnail raw moving image data Sn1$x$, thumbnail intermediate development moving image data Sn2x, thumbnail ordinary moving image data Sn3x, and development parameter group Pmx makes up one file, and these are collected to make up a raw moving image file.

The raw moving image format shown in FIG. 2 is convenient, for example, in the case of employing the raw moving image data S1, intermediate development moving image data S2, ordinary moving image data S3, thumbnail raw moving image data Sn1, thumbnail intermediate development moving image data Sn2, and thumbnail ordinary moving image data Sn3 for each scene.

However, in the case of playing and employing moving image data of multiple scenes, the format shown in FIG. 3 does not employ data not to be played as data to be processed, whereby access time can be reduced, and more rapid playback can be performed in some cases.

Obtaining Mode of Development Parameter Pm

In order to develop a raw image, there is a need to provide a development parameter group for instructing whether to perform what kind of development processing specifically. The development parameter group mentioned here is made up of various types of development parameters, for example, such as a parameter for exposure adjustment, parameter for white balance processing, parameter for NR processing, parameter for specifying whether to perform what kind of demosaic processing, parameter for saturation adjustment, parameter for color adjustment, and other development parameters.

Generally, in the case of a raw moving image, in order to perform development processing precisely, a complete development parameter group as to all of the frames is needed. Note however, there are many development parameters which do not vary so much as to the same scene, and it is ineffective to record all of the development parameter groups as to all of the frames. Also, it is not adequate to analyze information regarding whether a development parameter varies at which frame.

Therefore, with the detection processing unit 402 of the camera system 100 according to the present embodiment, the development parameter Pm as to the raw moving image data S1 can be generated and recorded in an adaptive manner. Specifically, development parameters are recorded in accordance with rules such as shown in the following (1) through (6).
(1) All of the development parameters are recorded at the beginning of a scene.
(2) A parameter is recorded with a certain interval other than the beginning of a scene.
(3) The above-mentioned "certain interval" is changed depending on the change frequency of a development parameter.
(4) Separately from (2), of the development parameters, a development parameter having a great variation or sudden variation is recorded as needed.
(5) At the time of (4) other parameters or all of the development parameters may be recorded simultaneously.
(6) It is desirable to generate the adaptive development parameters of the above-mentioned (1) through (5) at the time of recording. Note however, in a case wherein the performance of the camera system is insufficient, an arrangement may be made wherein a part or all of the parameters are recorded at the time of recording, and are generated by analysis of a development apparatus.

Figure 4:
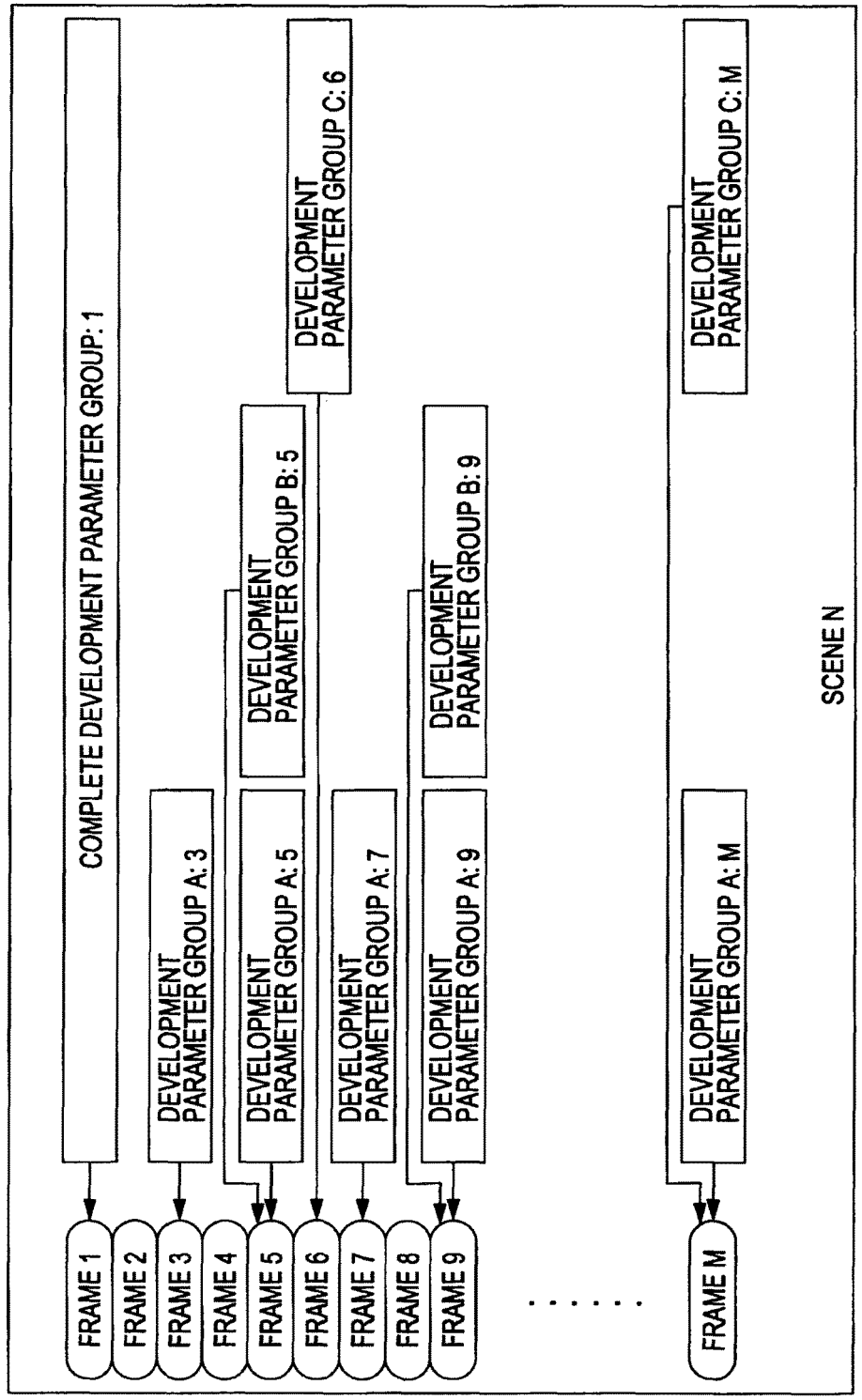
FIG. 4 is a diagram for describing a specific example in a case wherein a development parameter group is recorded.

FIG. 4 is a diagram for describing a specific example in a case wherein a development parameter group is recorded as to multiple frames making up a predetermined scene (scene N) in an adaptive manner in accordance with the above-mentioned rules (1) through (6).

As shown in FIG. 4, all of the development parameters (complete development parameter group: 1) are recorded as to the first frame (frame 1) of a scene. Subsequently, basically, a complete development parameter group is recorded as to a frame with a certain interval (as to a frame having timing wherein at least one frame is thinned out regularly).

Note that in FIG. 4, the description of ": 1" of "complete development parameter group: 1" represents the frame number of the corresponding frame to be added with the parameter group, and this is true for a development parameter group A, development parameter group B, and development parameter group C, which will be described below.

However, there is no need to perform recording of a complete development parameter group except for the beginning of a scene in some cases. Each development parameter included in a complete development parameter group has a high or low change frequency depending on the property thereof. A development parameter having a high change frequency needs to be updated early, a recording interval needs to be shortened, but in the case of a development parameter having a low change frequency, a recording interval can be prolonged.

That is to say, this is not two choices of whether or not a complete development group is recorded, and recording frequency is changed depending on the type of a development parameter. In the case of the scene N shown in FIG. 4, the development parameter group A is recorded as to frames of every one frame, development parameter group B is recorded as to frames of ever three frames, and development parameter group C is recorded as to frames of ever four frames.

Therefore, in the case of the example shown in FIG. 4, (complete development parameter group: 1) is recorded as to the first frame (frame 1) of the scene N, and with the frame 1 as a starting point, the corresponding (development parameter group A: 3), (development parameter group A: 5), (development parameter group A: 7), and so on through (development parameter group A: M) are recorded as to the frame 3, frame 5, frame 7, and so on through frame M which are frames of every one frame.

Further, with the frame 1 as a starting point, the corresponding (development parameter group B: 5), (development parameter group B: 9), and so on are recorded as to the frame 5, frame 9, and so on which are frames of every three frames. Also, with the frame 1 as a starting point, the corresponding (development parameter group C: 6), and so on through (development parameter group C: M) are recorded as to the frame 6, and so on through frame M which are frames of every four frames.

Note that with the example shown in FIG. 4, the complete development group includes all of the development parameters, the development parameter group A is made up of development parameters having a high change frequency, for example, such as brightness, color characteristics, or the like, the development parameter group B is made up of development parameters having a middle change frequency, for example, such as various types of interpolation processing parameter, or the like, and the development parameter group C is made up of development parameters having a low change frequency, for example, such as lens characteristics, or the like.

Also, there is a case wherein the features of a scene suddenly changes, such as a case wherein the shooting subject of the camera changes at the time of shooting, or the like. In such a case, a development parameter group markedly changes, so there is a need to record the development parameter group. Subsequently, there is no problem in a case wherein a certain interval to be added with the above-mentioned development parameter groups is sufficiently short, otherwise there is a need to record the development parameter groups separately from certain interval recording.

In this case, only a development parameter having a great variation may be recorded, a complete development parameter group may be recorded, or a development parameter group including a development parameter having an excessive variation may be recorded. Thus, with the camera system 100 according to the present embodiment, as shown in FIG. 4, a development parameter group is not added to all of the frames, but can be added to frames having a predetermined cycle or frames corresponding to change points in an adaptive manner. Thus, a development parameter group to be added to discontinuous frames in an adaptive manner will be referred to as an adaptive parameter group with the present Specification.

In the case of employing an adaptive development parameter group, there is also a need to detect an excessive variation of a development parameter by analyzing the variations of a development parameter, detection data (detection value), and raw moving image data (raw frame moving image data), to obtain an adaptive development parameter. With the camera system 100 according to the present embodiment, occurrence of excessive variation of a development parameter is detected at the detection processing unit 402, whereby a development parameter group can be added to a frame corresponding to a change point of a scene.

FIG. 5 is a block diagram for describing a configuration example of the detection processing unit 402 of the camera system 100 according to the present embodiment. As shown in FIG. 5, the detection processing unit 402 includes a detection circuit 4021, and adaptive development parameter analyzing unit 4022. Also, the detection circuit 4021 is configured of a detection data generating unit 4021a, and development parameter generating unit 4021b.

As described above with reference to FIG. 1, the raw moving image data S1 captured through the lens unit 101 and imaging device unit 102 is supplied to the detection processing unit 402 through the interface unit LSI 103 and sensor interface unit 401. The raw moving image data S1 thus supplied to the detection processing unit 402 is supplied to the detection data generating unit 4021a of the detection circuit 4021, and adaptive development parameter analyzing unit 4022, and also is output from the detection processing unit 402 as the raw moving image data S1.

The detection data generating unit 4021a sets a detection area made up of multiple division areas in a predetermined image area, generates detection data which is an evaluation value (detection value) regarding raw moving image data employed for automatic exposure adjustment, automatic white balance adjustment, and automatic focal point adjustment from the image data of each frame of the raw moving image data of each division area of this detection area, and supplies this to the development parameter generating unit 4021b, and adaptive development parameter analyzing unit 4022.

The development parameter generating unit 4021b forms, for example, various types of development parameter for each frame based on the detection data supplied thereto, and supplies this to the adaptive development parameter analyzing unit 4022. The adaptive development parameter analyzing unit 4022 performs analysis regarding detection data, development parameter group, and raw moving image data in increments of frames supplied thereto, such as obtaining the difference in increments of previous and subsequent frames, thereby detecting a scene change point (frame) or a position where a development parameter group excessively changes.

Subsequently, in the case of the adaptive development parameter analyzing unit 4022 detecting a scene change point, as described with reference to FIG. 4, the adaptive development parameter analyzing unit 4022 outputs a complete development parameter group to the first frame of a new scene. Also, in the case of the adaptive development parameter analyzing unit 4022 detecting a position where a development parameter has excessively changed, the adaptive development parameter analyzing unit 4022 outputs to a frame after variation a complete development group, a predetermined development parameter group including an excessively changed development parameter (e.g., development parameter group A, B, or C shown in FIG. 4), or only an excessively changed development parameter.

With the camera system 100 according to the present embodiment, in the case of detecting a position where a development parameter has excessively changed, for example, let us say that a complete development group is output. Also, with the adaptive development parameter analyzing unit 4022, as described with reference to FIG. 4, frames with a predetermined certain interval are also correlated with a development parameter group.

That is to say, the adaptive development parameter analyzing unit 4022 correlates discontinuous frames with a development parameter group in accordance with the above-mentioned procedures (1) through (6). Thus, with the camera system 100 according to the present embodiment, an adaptive development parameter can be output.

Thus, when detecting neither a scene change point nor an excessively change position of a development parameter, as described above with reference to FIG. 4, the adaptive development parameter analyzing unit 4022 can output a predetermined development parameter group to frames of every a predetermined number of frames.

Also, an arrangement may be made wherein the adaptive development parameter analyzing unit 4022 of the camera system 100 according to the present embodiment outputs all of the detection data groups including not only development parameters but also various types of data to the first frame of each scene in the same way as with development parameters, but outputs an ordinary detection group to other frames every several frames depending on the change frequency of each detection data, or in the case of detection data excessively changing, this data is output to the other frames as an adaptive detection data group.

Accordingly, a detection data group made up of detection data of a high change frequency can be output at short cycle timing, and a detection data group made up of detection data of a low change frequency can be output at relatively long cycle timing. Note that it goes without saying that a detection data group may be output for each frame to perform automatic exposure adjustment, automatic white balance adjustment, and automatic focal point adjustment suitably.

Thus, with the camera system 100 according to the present embodiment, the detection processing unit 402 does not add a development parameter to all of the frames of the raw moving image data S1, but can add the development parameter group Pm to discontinuous frames in an adaptive manner. Also, the detection processing unit 402 can also output the detection data group Dd in an adaptive manner.

If the above description is simply summarized, the detection processing unit 402 of the camera system 100 according to the present embodiment can output the raw moving image data S1, and also, on the other hand, as described with reference to FIG. 4, can output the development parameter group Pm by outputting a predetermined development parameter group for each predetermined cycle or at timing wherein a development parameter drastically changes.

Also, similar to an adaptive development parameter group, the detection processing unit 402 can output the detection data group Dd, for example, by outputting a predetermined detection data group for each predetermined cycle or at timing wherein detection data drastically changes.

Note that, as described above, timing for adding a development parameter to moving image data is changed depending on whether a development parameter has a high change frequency or low change frequency. In this case, as described above, a general tendency of a change frequency level can be understood beforehand for each development parameter to be employed, so based on this tendency there is a need to determine beforehand whether to add which development parameter to a frame of moving image data with how much interval.

Also, an arrangement may be made wherein change frequency is obtained at the adaptive development parameter analyzing unit 4022 of the detection processing unit 402 shown in FIG. 5 for each development parameter to be employed, and in accordance with the obtained change frequency, timing for adding to moving image data (added cycle) can be controlled regarding each development parameter at the time of shooting in an adaptive manner.

Figure 6A:
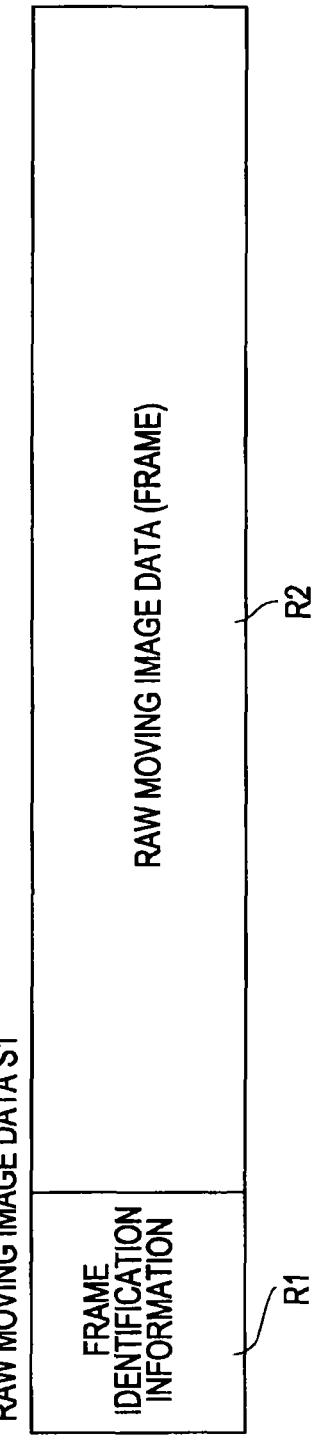
FIG. 6A is a diagram for describing a data format example of a raw moving image data S1.
Figure 6B:
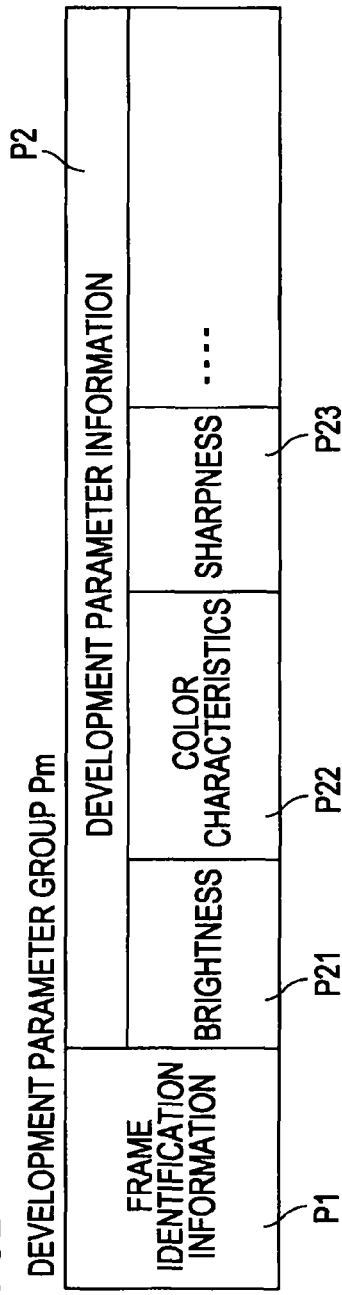
FIG. 6B is a data format example of a development parameter group Pm.

FIGS. 6A and 6B are diagrams for describing a data format example of the raw moving image data S1, and a data format example of the development parameter group Pm output from the detection processing unit 402 of the camera system 100 according to the present embodiment. As shown in FIG. 6A, the raw moving image data S1 is made up of frame identification information R1 for each frame, and raw moving image data R2 in increments of frames.

On the other hand, as shown in FIG. 6B, the development parameter group Pm is made up of frame identification information P1 indicating a frame of the corresponding raw moving image data to which the development parameter group Pm is added, and development parameter information P2, and the development parameter P2 is arranged so as to include each development parameter, such as brightness (P21), color characteristics (P22), sharpness (P23), and so forth.

Thus, a frame of the corresponding raw moving image data to which the development parameter group Pm is added, and the development parameter group Pm are linked with the frame identification information, whereby which development parameter group Pm is added to which frame of the raw moving image data S1 can be distinguished and used.

That is to say, as a general rule, with a raw still image, a development parameter group is inevitably added to one sheet worth of raw still image data. However, as described above, a group of a great number of raw frame images is raw moving image data. Accordingly, with the raw moving image format according to the present embodiment, there is a need to provide information for determining whether a development parameter group should be applied to which frame of recorded raw moving image data. This information is not needed in the case of all of the development parameters being recorded to all of the frames, but is inevitably needed in the case of holding raw moving image data compressed in the temporal axis direction, or as described above, in the case of recording of development parameters being thinned out in the temporal axis direction, or the like.

Description has been made wherein the frame identification information is employed in the case of the example shown in FIGS. 6A and 6B, but this frame identification information is information specific to each frame, and various types of information can be employed, for example, such as a frame number, time information from the top, sequence number from the top, and so forth.

Note that, with the camera system 100 according to the present embodiment, as shown in FIG. 4, multiple development parameter groups may be added to one frame, for example, such that the development parameter groups A and B are added to the frames 5 and 9, and the development parameter groups M and C are added to the frame M.

Also, as described above, it is desirable to generate an adaptive development parameter within the camera system (imaging apparatus), but in a case wherein the processing capacity of the camera system is insufficient, or the like, a raw development apparatus may be employed for analysis to calculate an adaptive parameter group within the raw development apparatus.

Also, an arrangement may be made wherein, with the imaging apparatus, a development parameter to be added to all of the frames, and a development parameter group to be added with a certain interval or timing of thinning are all recorded in a raw moving image file, and this file is employed within the raw development apparatus as described later, and also a scene change point is also detected, and a development parameter group is newly added to the frame of this change point.

Another Example of Raw Moving Image File

Incidentally, in the case of a raw moving image, there is a case wherein it is desirable to be able to employ optimal picture-making parameters depending on the purpose thereof. For example, there are various types of picture-making, such as film-style picture-making, picture-making where vivid colors are pronounced, and so forth, depending on the use of a moving image. There is a case wherein the user selects target picture-making by setting shooting settings suitably at the time of recording a moving image, and in the case of a raw moving image, there is a case to specify picture-making at the time of development.

Therefore, with the camera system 100 according to the present embodiment, multiple development parameter groups of different picture-making can be recorded simultaneously regardless of shooting the same scene at the time of recording. That is to say, under the control of the CPU 410, the detection processing unit 402 of the camera system 100 according to the present embodiment can generate at least four types of development parameters together as to the same moving image data at the time of shooting of a moving image to record these.

Specifically, the detection processing unit 402 of the camera system 100 according to the present embodiment allows four types of different development parameter groups of a development parameter group (film style) Pm(a), development parameter group (vivid) Pm(b), development parameter group (for scenery) Pm(c), and development parameter group (emphasis on skin) Pm(d) to be generated. Also, the detection processing unit 402 of the camera system 100 according to the present embodiment allows these development parameter groups to be recorded in the recording medium 109 along with raw moving image data and the like.

Figure 7:
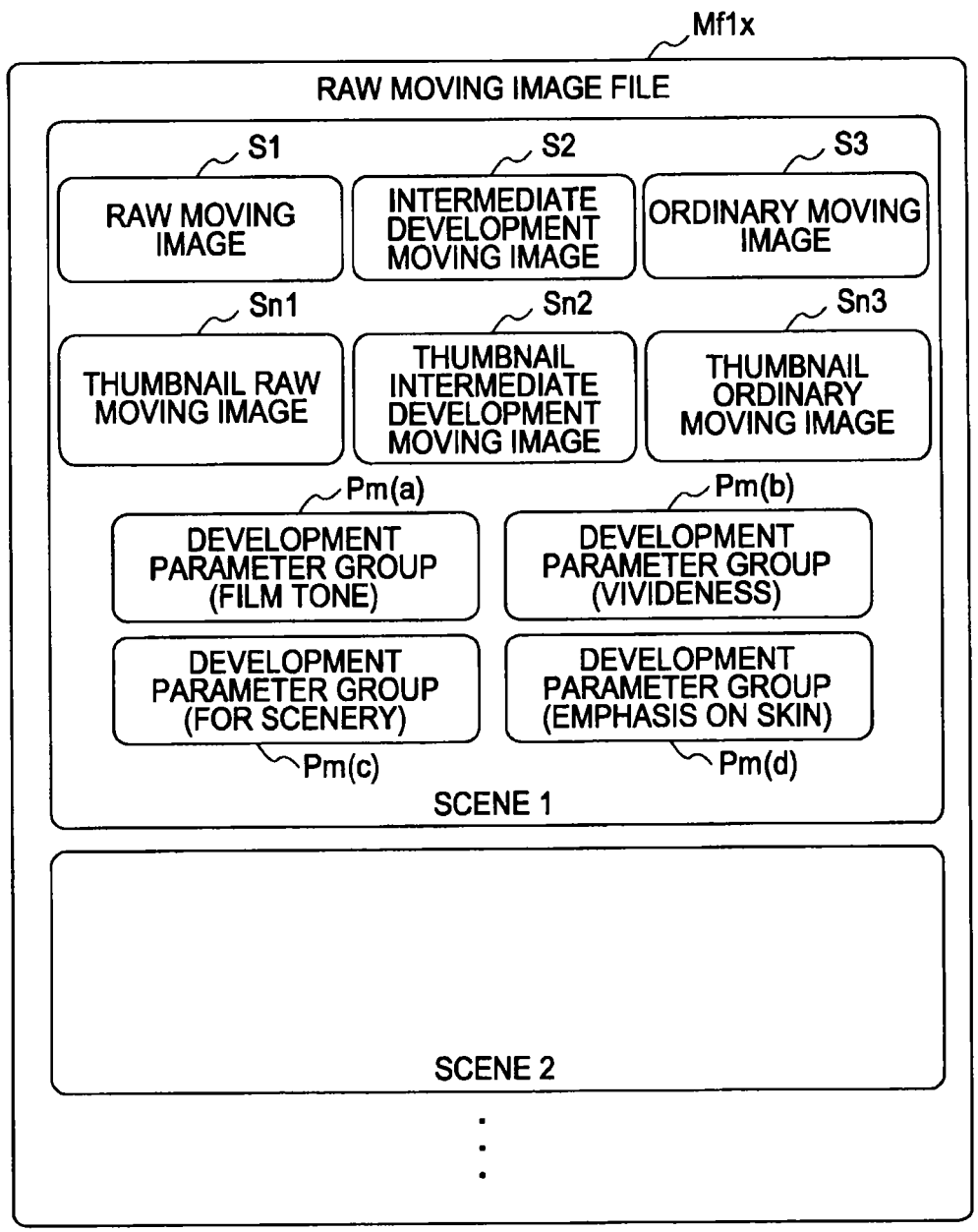
FIG. 7 is a diagram for describing another example (raw moving image file Mf1x) of a raw moving image file to be recorded in a recording medium.

FIG. 7 is a diagram for describing another example (raw moving image file Mf1x) of a raw moving image file to be recorded in the recording medium 109 at the camera system 100 according to the present embodiment. In FIG. 7, the raw moving image data S1, intermediate development moving image data S2, ordinary moving image data S3, thumbnail raw moving image data Sn1, thumbnail intermediate development moving image data Sn2, and thumbnail ordinary moving image data Sn3 are each generated and recorded in the same way as with the case of the raw moving image file Mf1 described with reference to FIG. 2.

In the case of the example shown in FIG. 7, as described above, as the development parameter groups to be generated at the detection processing unit 402 each of the four types of different development parameter groups of a development parameter group (film style) Pm(a), development parameter group (vivid) Pm(b), development parameter group (for scenery) Pm(c), and development parameter group (emphasis on skin) Pm(d) is recorded in the recording medium 109 through the recording/playback processing unit 409.

Thus, instructing to employ a development parameter corresponding to target picture-making at the time of playback of raw moving image data can make it unnecessary to purposely generate a development parameter at the time of playback. That is to say, the user can subject the raw moving image data recorded in the recording medium 109 to development processing using the development parameter group of target picture-making of the user while adding adjustment thereto, whereby the raw moving image data can be subjected to development processing in a user's intended manner. Also, blending (mixture) of multiple development parameter groups can also be specified, and accordingly, effects such as film tone with a vivid color, and so forth can be obtained. Interpolation of Development Parameter at the Time of Development Processing As described with reference to FIG. 4 and the like, the camera system 100 according to the present embodiment does not add a development parameter group to all of the frames of raw moving image data, but add a development parameter group to only discontinuous frames which need to be added with the development parameter.

Thus, in the case of developing raw moving image data wherein a development parameter group is added to discontinuous frames, there is a need to interpolate a development parameter group as to frames to which no development parameter group is added. Description will be made below regarding interpolation of a development parameter group in the case of developing the raw moving image data recorded in the recording medium 109 with the camera system 100 according to the present embodiment.

Figure 8:
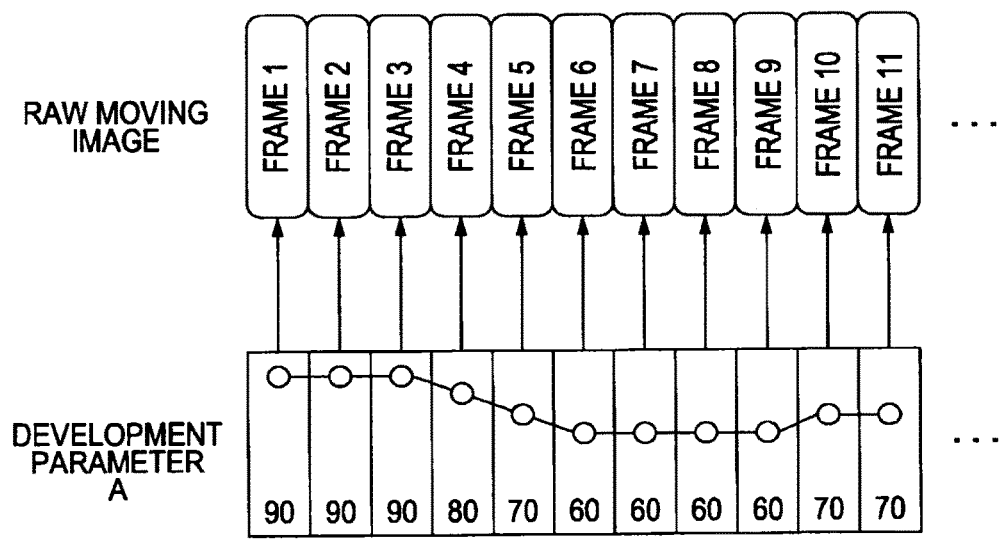
FIG. 8 is a diagram for describing interpolation of a development parameter.

FIGS. 8 through 17 are diagrams for describing interpolation of a development parameter. Now, let us say that, as shown in FIG. 8, with the camera system 100 according to the present embodiment, a development parameter is generated at the detection processing unit 402 as to each frame of a predetermined scene of raw moving image data obtained in the case of shooting a moving image, and is correlated therewith.

Note that, in reality, there are a great number of development parameters, and as described above, there are many cases wherein development parameters exist as a development parameter group, and also there are many cases wherein development parameter groups exist in a combination of numeric values. However, in order to simplify description, description will be made regarding a case wherein one type of development parameter is correlated with each frame as an example.

Figure 9:
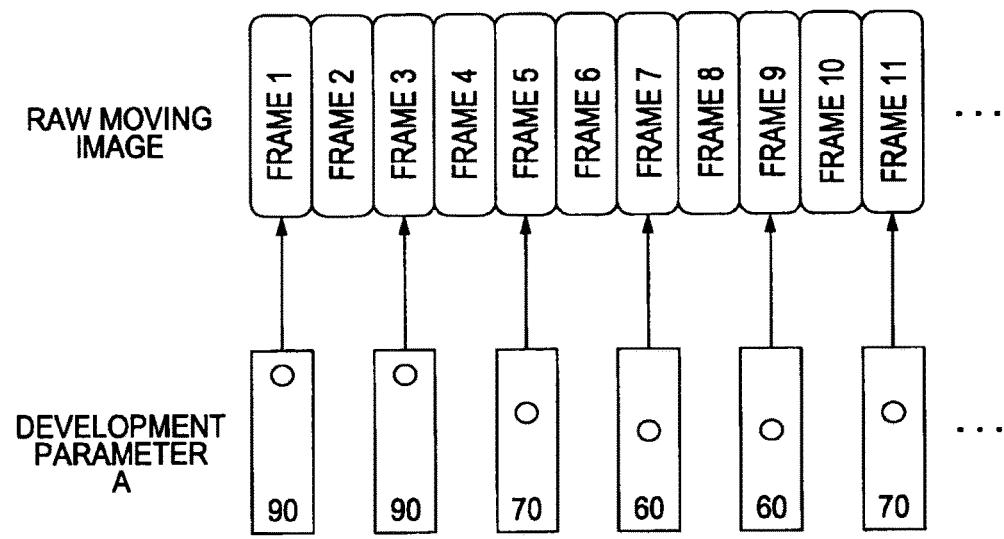
FIG. 9 is a diagram for describing interpolation of a development parameter.

In the case of the example shown in FIG. 8, the change frequency of the development parameters A is not high so much, so let us say that with the camera system 100 according to the present embodiment, at the time of recording raw moving image data and development parameters A in the recording medium 109 one development parameter A is recorded as to two frames as shown in FIG. 9 (recorded every one frame).

Figure 10:
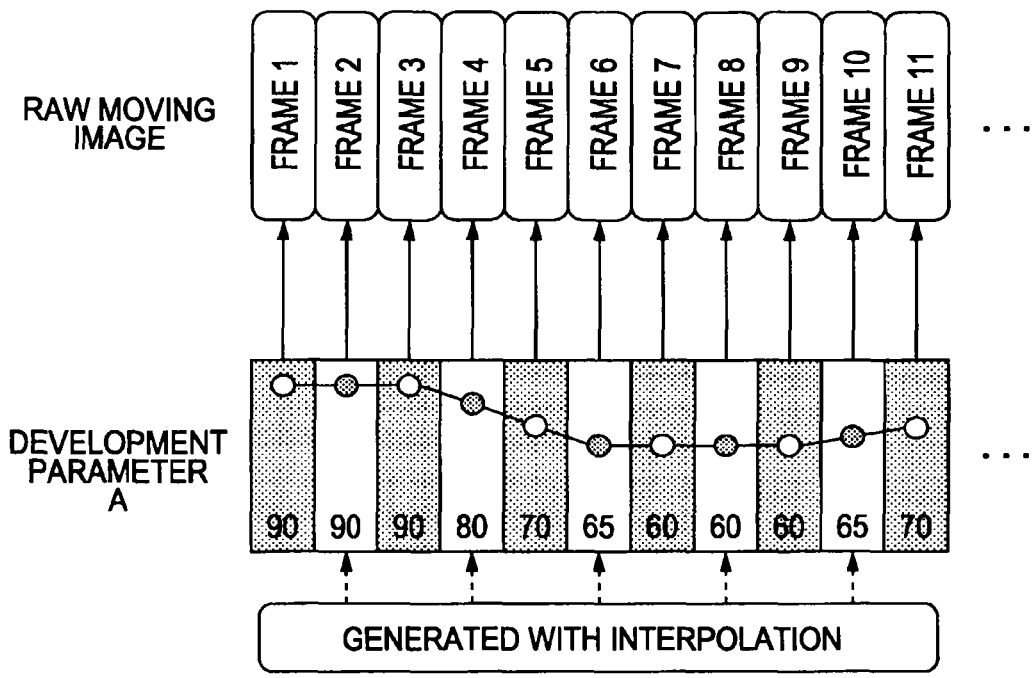
FIG. 10 is a diagram for describing interpolation of a development parameter.

Subsequently, in a case wherein the raw moving image data and development parameters A recorded in the recording medium 109 are read out from the recording medium 109 and developed, the image processing unit 403 of the camera system 100 according to the present embodiment subjects the development parameters A read out from the recording medium 109 and supplied to the image processing unit 403 to interpolation processing and development such as shown in FIG. 10.

In the case of this example, as shown in FIG. 10, the development parameters A corresponding to even frames are interpolated development parameters. With the example shown in FIG. 10, linear interpolation is performed. Note however, in reality, it is desirable to employ a suitable interpolation algorithm such as spline interpolation, Bezier interpolation, or the like.

Also, in a case wherein development is performed using the above-described adaptive development parameter as well, development processing can be performed in the same way. Now, as shown in FIG. 11, let us say that, with the camera system 100 according to the present embodiment, a development parameter is generated at the detection processing unit 402 as to each frame of a predetermined scene of raw moving image data obtained in the case of shooting a moving image, and is correlated therewith.

Figure 12:
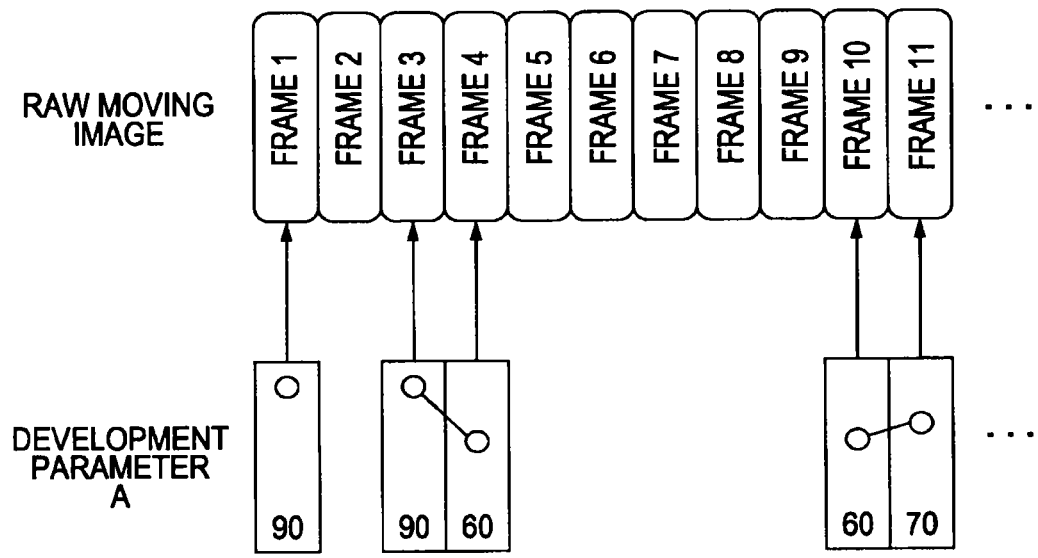
FIG. 12 is a diagram for describing interpolation of a development parameter.

Subsequently, in the case of this example, let us consider that the camera system 100 correlates a development parameter serving as an adaptive development parameter with a frame wherein a development parameter greatly changes. Specifically, as shown in FIG. 12, let us say that as adaptive development parameters a development parameter as to a frame before change in the case of a development parameter greatly changing, and a development parameter as to a frame immediately after change are recorded in the recording medium 109 along with the raw moving image data. Note that, as described above, a development parameter is added to the first frame of each scene of raw moving image data.

Figure 11:
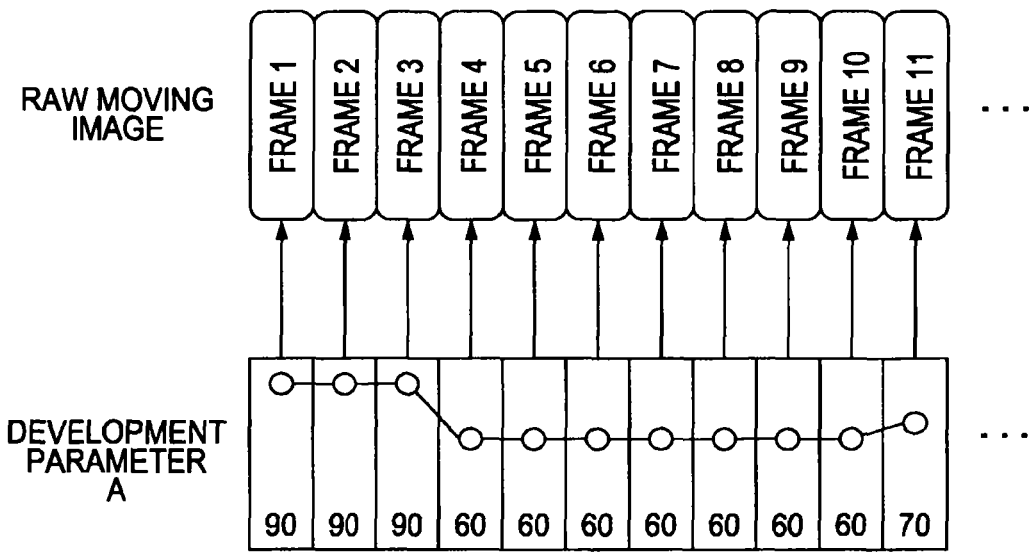
FIG. 11 is a diagram for describing interpolation of a development parameter.

Thus, the raw moving image data, and development parameters A in a state shown in FIG. 11 obtained by shooting, can be recorded in the recording medium 109 with the development parameters A as adaptive development parameter.

Subsequently, as shown in FIG. 12, the correlated raw moving image data and adaptive development parameters are recorded in the recording medium 109, and in the case of reading out these, supplying these to the image processing unit 403, and performing development processing, the image processing unit 403 interpolates a development parameter as to a frame not correlated with a development parameter.

Figure 13:
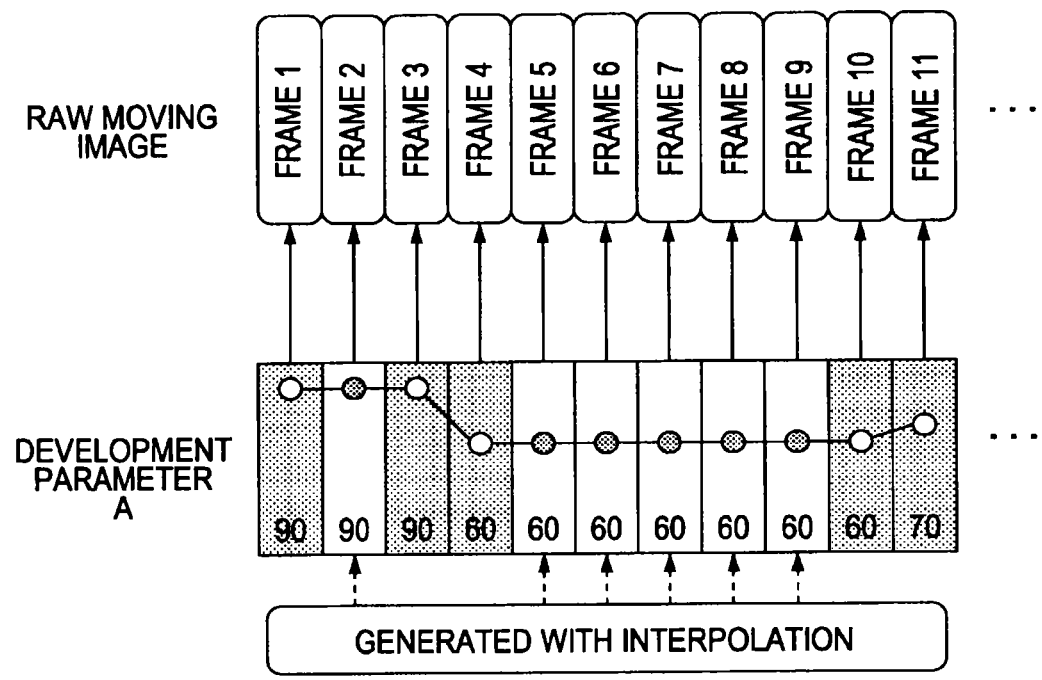
FIG. 13 is a diagram for describing interpolation of a development parameter.

In the case of this FIG. 13 as well, the development parameter of a frame not correlated with a development parameter is restored by linear interpolation based on adaptive development parameters. Thus, in FIG. 13, development parameters as to the frames 2, 5 through 9 are restored, and development processing is performed using these.

Also, an advantage obtained by employing adaptive development parameters is not only reduction of the data amount. In a case wherein the user adjusts a development parameter, the user can perform adjustment of the development parameter at a change point intuitively. That is to say, with regard to development parameters, in a case wherein a development parameter is held as to a frame having no change between adjacent frames, even if the user attempts to change the development parameter as to a frame having no change between adjacent frames, the change is applied to only the frame thereof. That is to say, there is no reference to extend influence to the surrounding frames.

Figure 14:
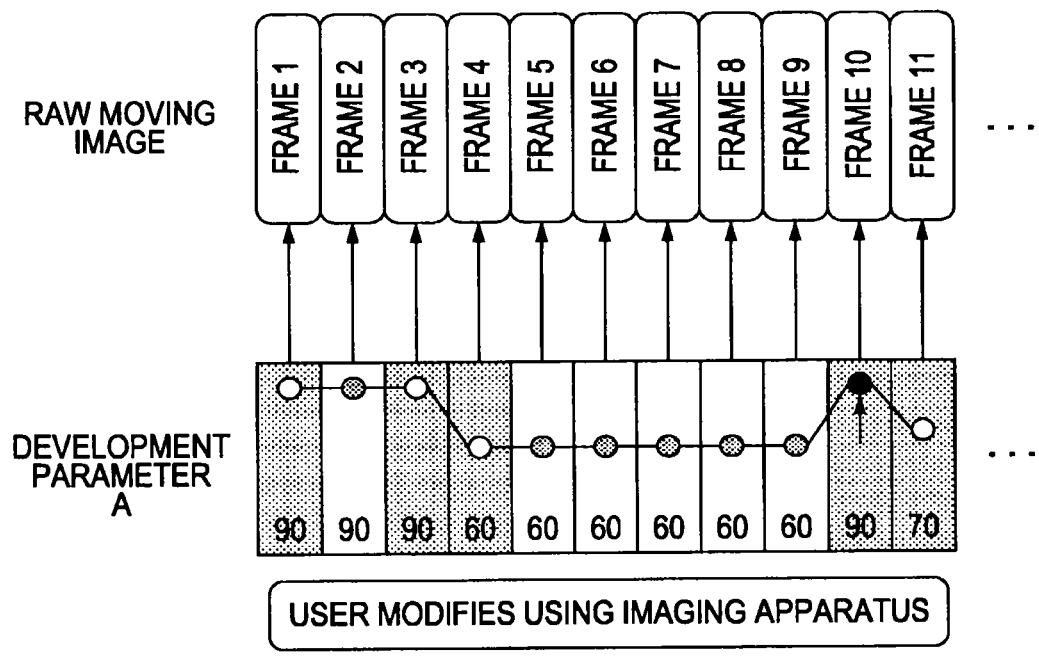
FIG. 14 is a diagram for describing interpolation of a development parameter.

However, in the case of adaptive development parameters, for example, let us say that, an adaptive development parameter of which the value correlated with a frame 10 is "60" in FIG. 13 is adjusted to "90" such as shown in FIG. 14.

Figure 15:
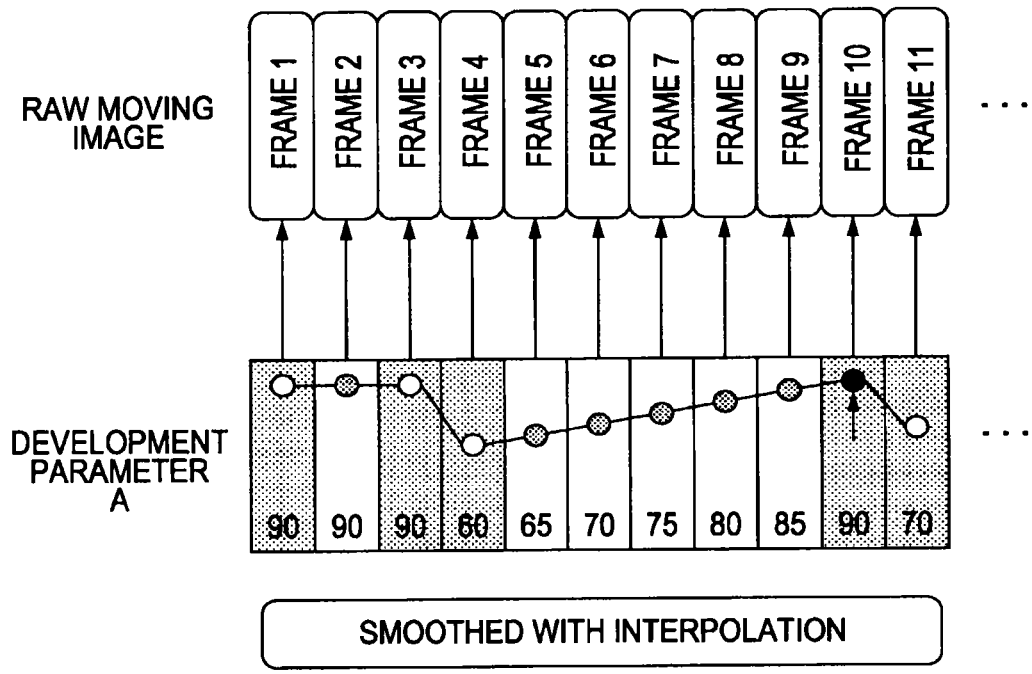
FIG. 15 is a diagram for describing interpolation of a development parameter.

In this case, after the adaptive development parameter correlated with the frame 10 is adjusted, the interpolated development parameters are also subjected to interpolation processing again, whereby the interpolated development parameters are influenced by the adaptive development parameter adjusted by the user, and can also be subjected to correction automatically, as shown in FIG. 15.

Figure 16:
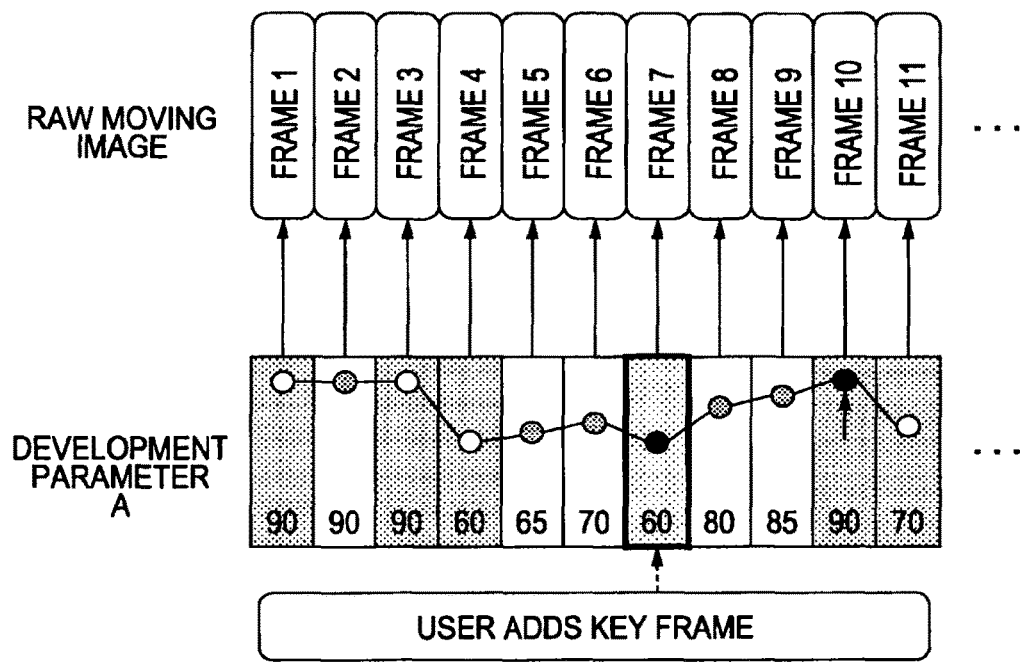
FIG. 16 is a diagram for describing interpolation of a development parameter.
Figure 17:
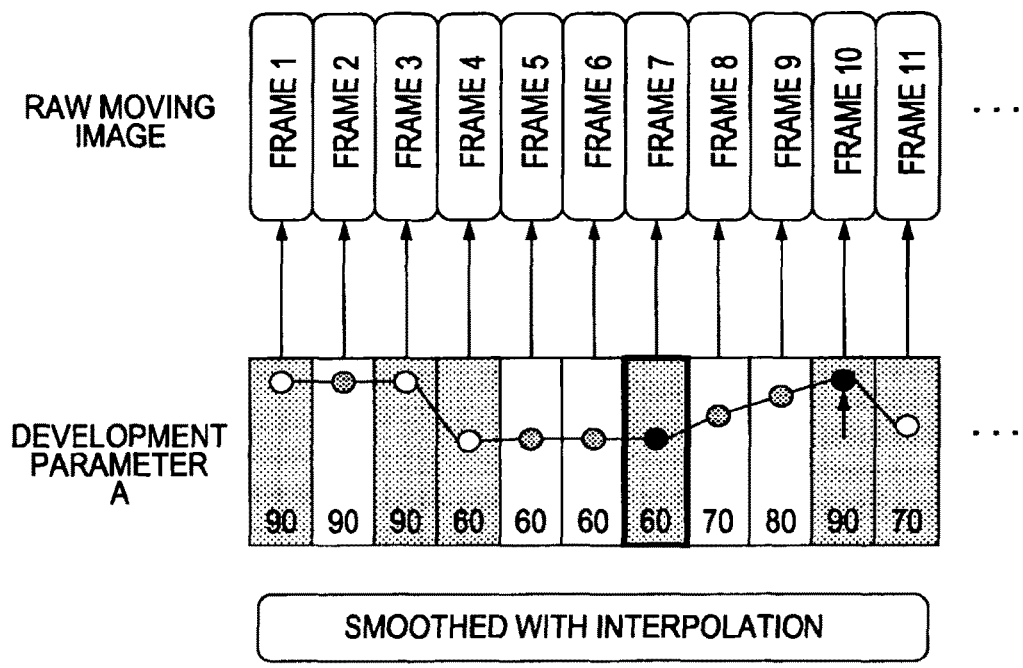
FIG. 17 is a diagram for describing interpolation of a development parameter.

Further, as shown in FIG. 16, a frame to which the adaptive development parameter has not been added (frame 7 in the case of the example of FIG. 16) is specified as a key frame, the development parameter of the specified key frame thereof is adjusted, and then interpolation processing is performed again, whereby the development parameter correlated with each frame of the raw moving image data is corrected, and more natural development parameters can be obtained, as shown in FIG. 17.

Thus, a concept called a key frame is employed, and also interpolation processing is performed again, whereby a tool for adjusting development parameters as to raw moving image data, which is intuitive for the user, can be provided, and adjustment of the development parameters as to the raw moving image data can be performed suitably.

Note that, with adjustment of development parameters regarding such raw moving image data, there can be conceived two types of interface of a case wherein the values of development parameters are all set to the center by the settings at the time of shooting, and adjustment of development parameters is performed only at the user's adjustment point, and a case wherein as described with reference to FIG. 12, the development parameter of a change point where a development parameter has changed at the time of shooting is recorded and shown to the user, and the user adjust the development parameter with reference to this. In the former case, data closely relating to the adjustment items thereof is arrayed and provided is some cases. In the latter case, the user can also adjust original change points, but can also add a change point newly, and provide complicated adjustment results in the temporal axis direction.

Summary of Operation of Camera System 100

Next, description will be made regarding each of processing at the time of shooting of the camera system 100 according to the present embodiment (processing at the time of recording moving image data), and processing at the time of playback of the raw moving image data recorded in the recording medium 109 by shooting, with reference to the flowcharts shown in FIGS. 18 and 19.

Summary of Processing at the Time of Shooting of Moving Image

Figure 18:
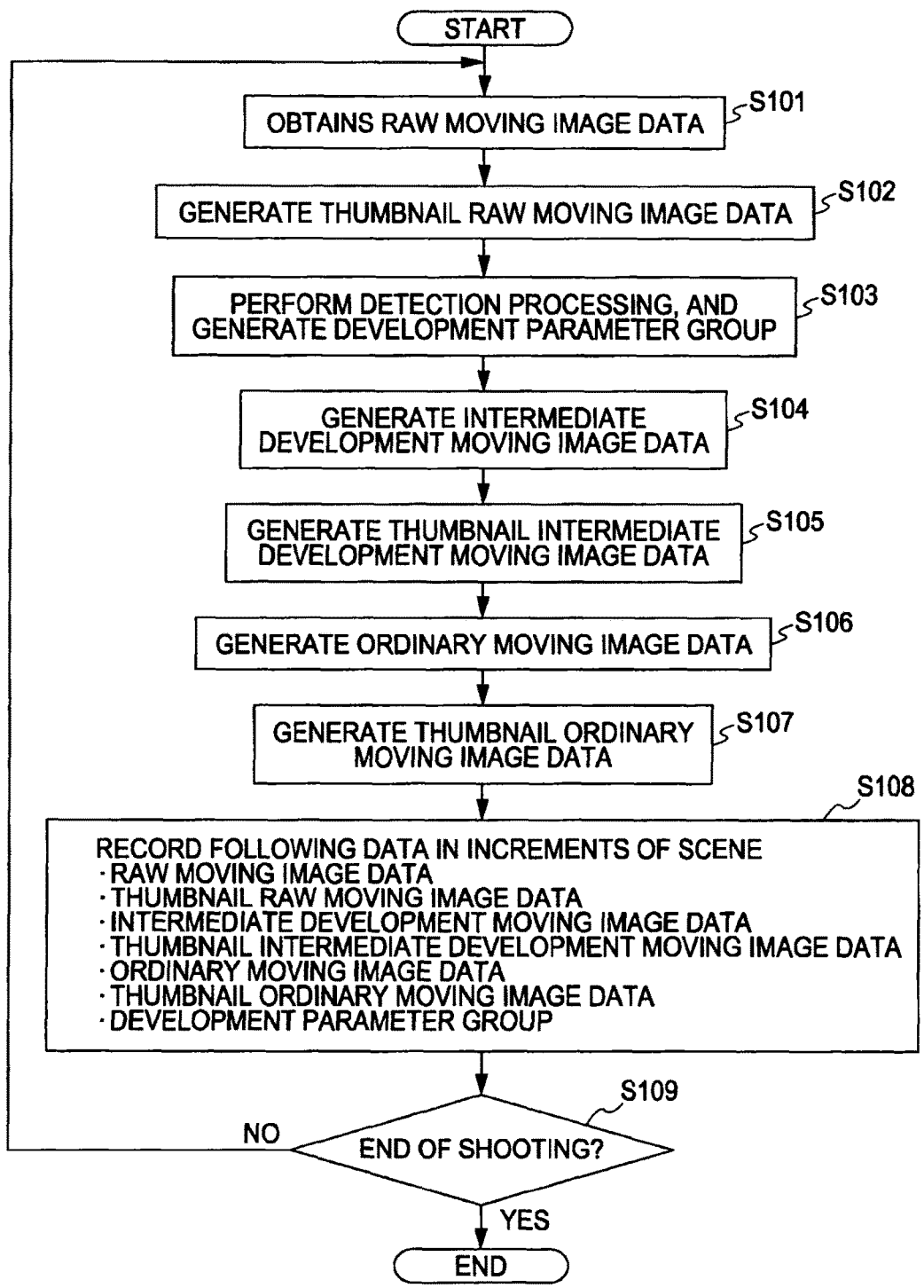
FIG. 18 is a flowchart for describing processing at the time of shooting of moving image data, which is executed at the camera system.

FIG. 18 is a flowchart for describing processing at the time of shooting of moving image data executed by the camera system 100 according to the present embodiment. The processing shown in FIG. 18 is executed by the CPU 410 controlling each unit in the case of accepting operating input for starting shooting of a moving image through the operating unit 107.

First, the CPU 410 controls the sensor interface unit 401 to obtain the raw moving image data S1 supplied through the lens unit 101, imaging device unit 102, and interface unit LSI 103, and supplies this to the detection processing unit 402 (step S101). The detection processing unit 402 supplies the raw moving image data S1 to the thumbnail raw moving image generating unit 421, thereby generating thumbnail raw moving image data Sn1 (step S102).

Also, the detection processing unit 402 performs detection processing for each frame of the supplied raw moving image data S1, thereby generating detection data (detection value) for each frame, and based on this detection data, a development parameter group is generated for each frame, and further, a development parameter group is correlated with discontinuous frames in accordance with the above-mentioned reference, thereby generating an adaptive development parameter group (step S103).

Subsequently, the raw moving image data S1 from the detection processing unit 402, and the adaptive development parameter Pm are supplied to the image processing unit 403, and with the image processing unit 403, development processing is performed up to the middle thereof, thereby generating intermediate development moving image data S2 (step S104). In this case, the image processing unit 403 supplies the generated intermediate development moving image data S2 to the thumbnail intermediate development moving image generating unit 422. The thumbnail intermediate development moving image generating unit 422 generates thumbnail intermediate development moving image data Sn2 from the intermediate development moving image data S2 supplied thereto (step S105).

Also, after generating the intermediate development moving image data S2, the image processing unit 403 further advances the development processing, and ultimately forms YC data from the supplied raw moving image data S1. This YC data is supplied from the image processing unit 403 to the resolution conversion processing unit 404, where resolution conversion processing is performed, image data for display is formed, this is supplied to the compression processing unit 405, and subjected to data compression using a predetermined data compression method, thereby generating ordinary moving image data S3 for recording to be recorded in the recording medium 109 (step S106).

Further, the image data for display output from the resolution conversion processing unit 404, or the ordinary moving image data from the compression processing unit 405 is supplied to the thumbnail ordinary moving image generating unit 423, where thumbnail ordinary moving image data Sn3 is generated (step S107).

Subsequently, the control unit 410 records the raw moving image data S1, thumbnail raw moving image data Sn1, intermediate development moving image data S2, thumbnail intermediate development moving image data Sn2, ordinary moving image data S3, and thumbnail ordinary moving image data Sn3 generated at the corresponding respective units as described above, in the recording medium 109 in increments of scenes through the recording/playback processing unit 409 (step S108).

Subsequently, the CPU 410 determines whether or not an event for ending shooting has occurred such that shooting end instructions have been accepted from the user through the operating unit 107 (step S109). In a case wherein determination is made in step S109 that an event for ending shooting has not occurred, the processing form step S101 is repeated. Also, in a case wherein determination is made in step S109 that an event for ending shooting has occurred, the CPU 410 ends the processing shown in FIG. 18, and ends shooting of a moving image.

Note that description has been made here assuming that the ordinary moving image data S3 has been subjected to data compression by the function of the compression processing unit 405, but the present invention is not restricted to this. An arrangement may be made wherein the raw moving image data S1 and intermediate development image data S2 are also subjected to data compression, for example, by the function of the compression processing unit 405 or the function of a compression processing circuit separately provided, in accordance with a predetermined data compression method, and then are recorded in the recording medium 109.

Also, an arrangement may be made wherein the thumbnail raw moving image data Sn1, thumbnail intermediate development moving image data Sn2, and thumbnail ordinary moving image data Sn3 are also subjected to data compression, for example, by the function of the compression processing unit 405 or the function of a compression processing circuit separately provided, in accordance with a predetermined data compression method, and then are recorded in the recording medium 109.

Also, it goes without saying that the ordinary moving image data S3 can record as is without being subjected to data compression.

Thus, with the camera system 100 according to the present embodiment, the raw moving image data S1, intermediate development moving image data S2, ordinary moving image data S3, thumbnail raw moving image data Sn1, thumbnail intermediate development moving image data Sn2, thumbnail ordinary moving image data Sn3, and adaptive development parameter Pm obtained by shooting a moving image can be recorded in the recording medium 109.

Summary of Processing at the Time of Playback of Raw Moving Image Data

Figure 19:
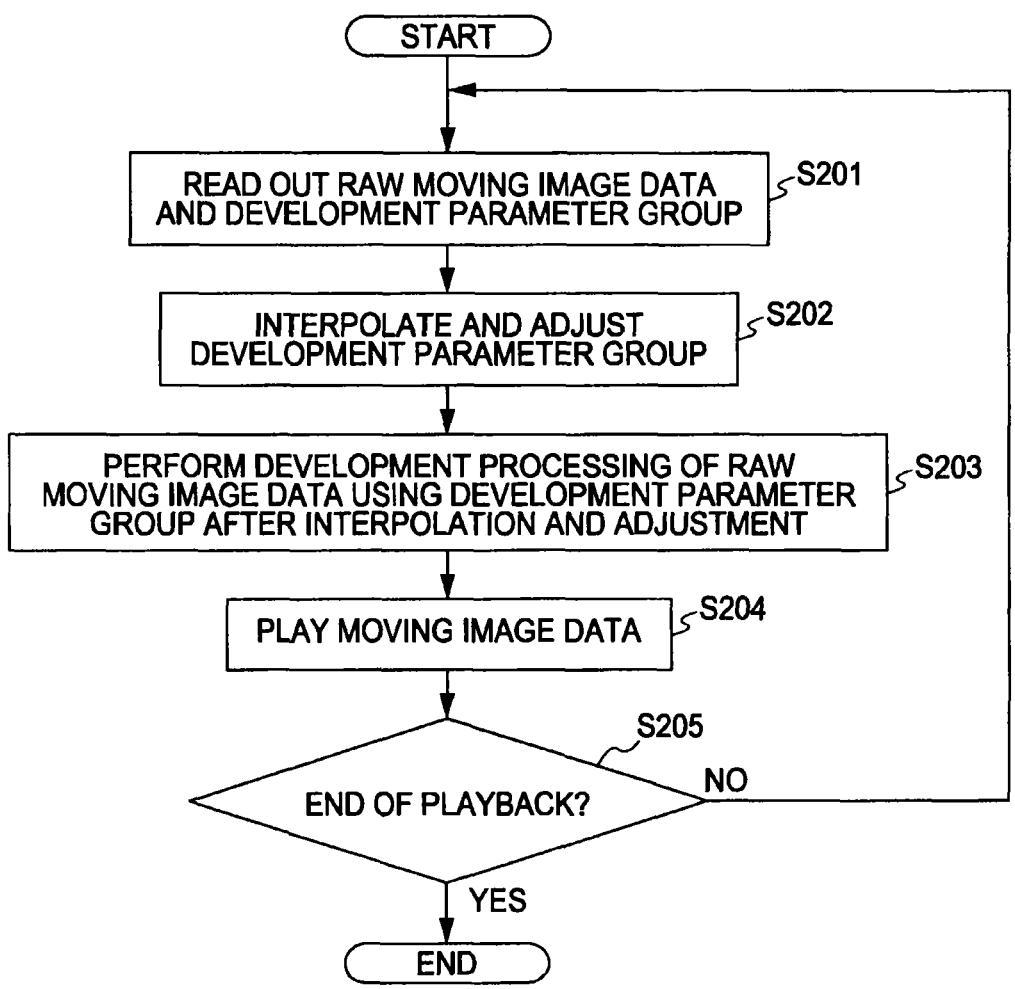
FIG. 19 is a flowchart for describing processing at the time of playback of raw moving image data recorded in the recording medium, which is executed at the camera system.

FIG. 19 is a flowchart for describing processing at the time of playback of raw moving image data recorded in the recording medium 109, which is executed by the camera system 100 according to the present embodiment. The processing shown in FIG. 19 is processing executed by the CPU 410 controlling the respective units in the case of accepting operating input for starting playback of raw moving image data through the operating unit 107.

The CPU 410 controls the recording/playback processing unit 409 to read out the raw moving image data S1 instructed to play, and the development parameter (adaptive development parameter) Pm corresponding thereto, and supplies these to the image processing unit 403 (step S201). Note that when the raw moving image data S1 to be played is data subjected to data compression, and recorded in the recording medium 109, this data is subjected to decompression processing, for example, by the function of the decompression processing unit 408 following being read out from the recording medium 109, and supplied to the image processing unit 403.

Subsequently, under the control of the CPU 410, the image processing unit 403 performs the interpolation processing of the development parameter group Pm supplied thereto, and processing for adjusting the development parameter in response to input of modification instructions as to the development parameter group from the user accepted through the operating unit 107 (step S202).

Subsequently, the image processing unit 403 performs the development processing of the read raw moving image data using the development parameter after interpolation and adjustment to generate YC data (step S203). The YC data generated here is supplied to the resolution conversion processing unit 404, and subjected to resolution conversion to generate image data for display, this is supplied to the display device 106 through the display processing unit 406 and display processing LSI 105, and the moving image corresponding to the read raw moving image data is played on the display screen of the display device 106 (step S204).

Subsequently, the CPU 410 determines whether or not an event for ending the playback processing has occurred, such as playback end instructions of raw moving image data through the operating unit 107, completion of playback of the raw moving image data instructed to play, or the like (step S205).

In a case wherein determination is made in step S205 that an event for ending the playback processing has not occurred, the CPU 410 repeats the processing from step S201, and continues the playback processing. Also, in a case wherein determination is made in step S205 that an event for ending the playback processing has occurred, the processing shown in FIG. 19 ends.

Thus, with the camera system 100 according to the present embodiment, the raw moving image data S1 and development parameter group Pm obtained by shooting are employed, whereby the raw moving image data can be subjected to development processing, and played. Also, the development parameter group is adjusted, whereby the user can perform desired picture-making.

Note that FIG. 19 is a diagram for describing a case wherein the raw moving image data S1 is played, but in the case of playing the thumbnail raw moving image data Sn1 as well, the same playback processing is performed. Also, the intermediate development moving image data S2 and thumbnail intermediate development moving image data Sn2 can be played by the playback processing in accordance with the flowchart shown in FIG. 19.

However, in the case of the intermediate development moving image data S2 and thumbnail intermediate development moving image data Sn2, the development processing performed in step S203 is not development processing to be performed first but development processing to be performed later. That is to say, as described above, the intermediate development moving image data according to the present embodiment is formed by exposure adjustment processing, white balance adjustment processing, NR processing, and interpolation processing (demosaic processing) being performed, so the subsequent saturation adjustment processing and color tone adjustment processing are performed here. Of course, this is but an example, so various patterns can be conceived.

Development Apparatus

The camera system 100 according to the above-mentioned embodiment shoots a moving image to obtain raw moving image data, records this in the recording medium 109, and also subjects the raw moving image data recorded in the recording medium 109 to development processing, and plays this. That is to say, the camera system 100 according to the above-mentioned embodiment has both of the function as the imaging apparatus, and the function as the development apparatus.

However, camera systems are generally carried and used, so there is a need to realize reduction in size and reduction in weight, but thus, processing capacity is restricted in some cases, e.g., the function as the development apparatus which is a portion other than the function as the imaging apparatus is sometimes omitted. In such a case, there is a need to provide a development apparatus for subjecting the raw moving image data shot by the camera system to development processing.

Description will be made below regarding a configuration example of an image proceeding device including a function as a development apparatus for subjecting raw moving image data to development processing. Note that the image processing device can be configured as a dedicated device for processing raw moving image data alone, or can also be realized by implementing the function as the image processing device in a personal computer.

Figure 20:
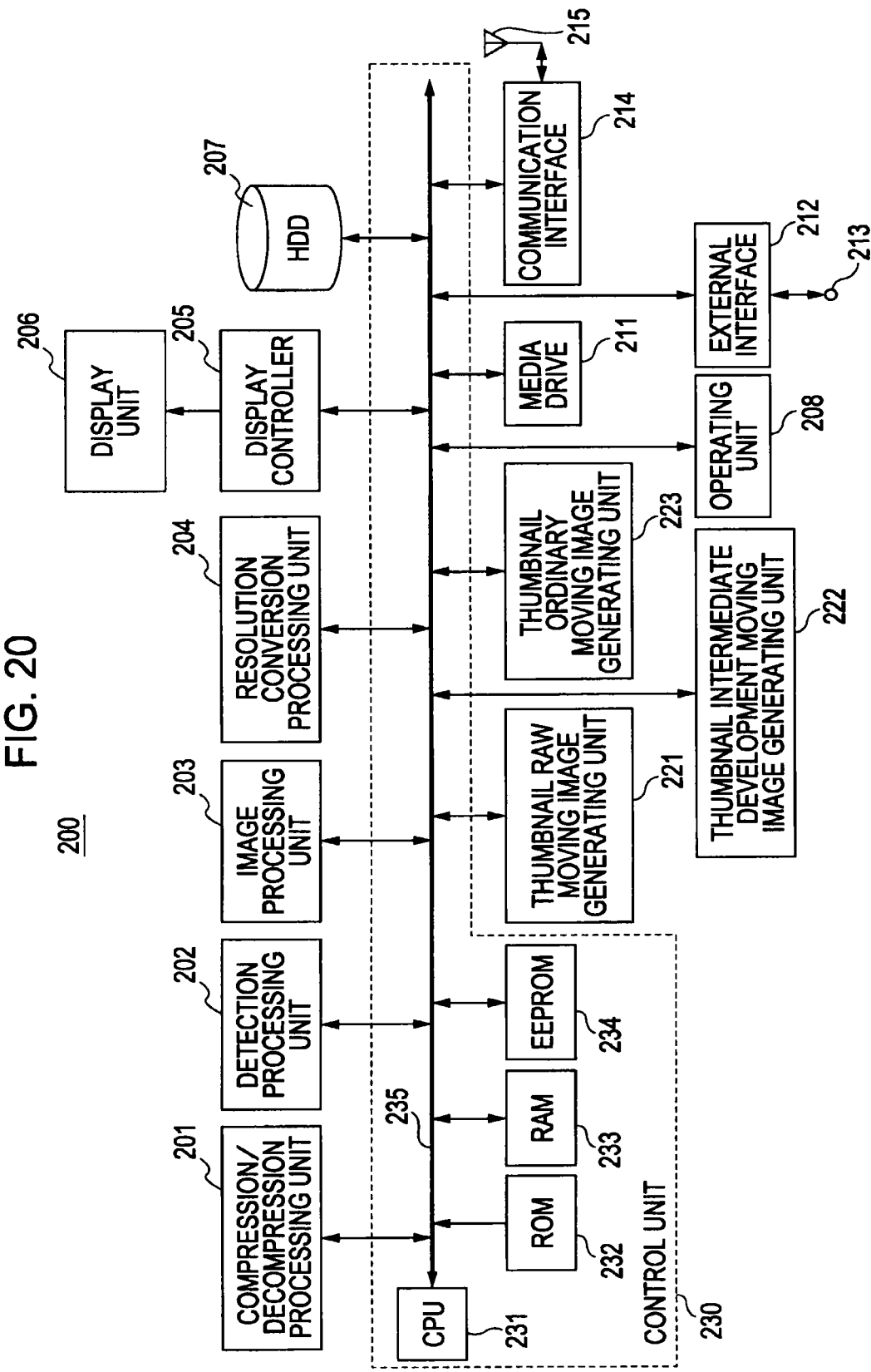
FIG. 20 is a block diagram for describing an image processing device to which an embodiment of the present invention has been applied.
Figure 21:
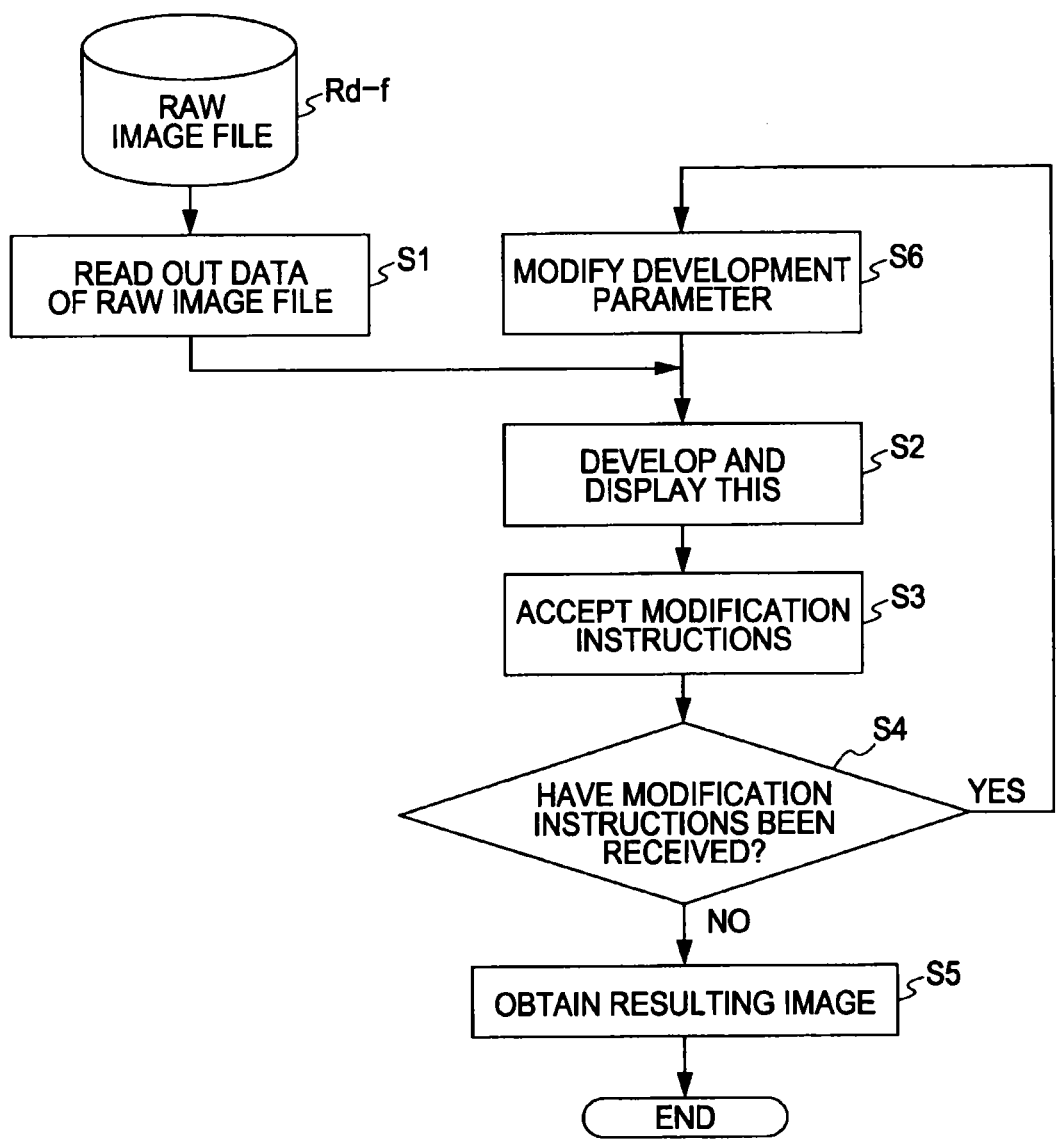
FIG. 21 is a diagram for describing development processing of raw image data of a still image according to the related art.
Figure 22:
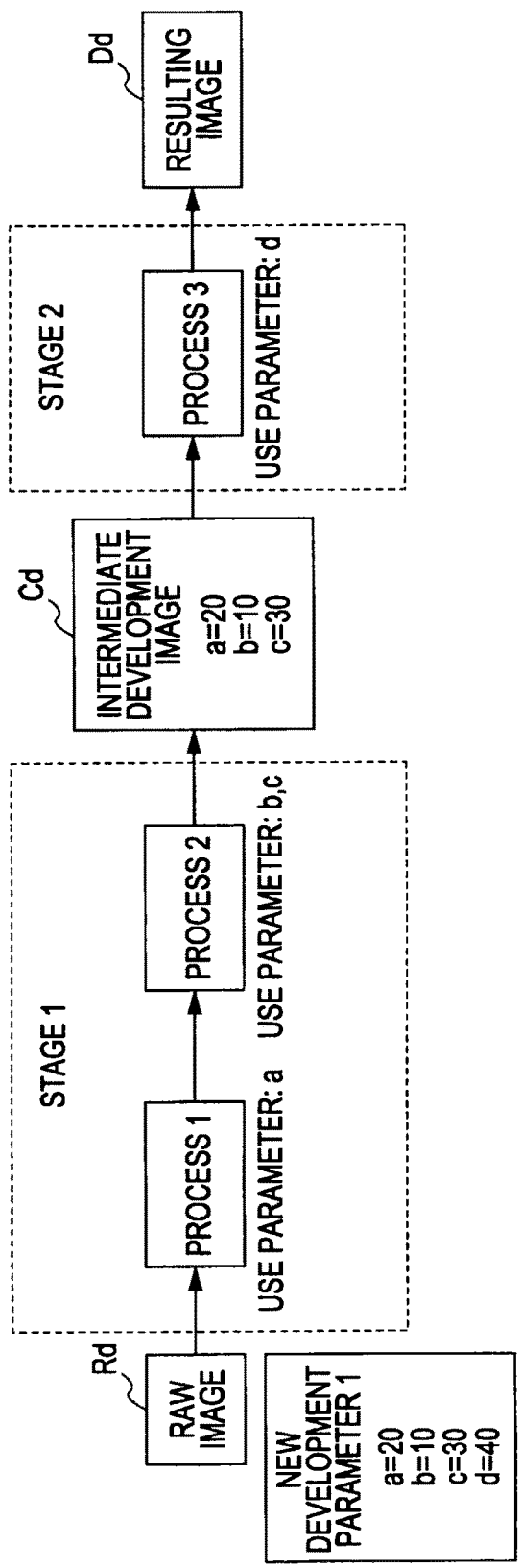
FIG. 22 is a diagram for describing development processing of raw image data of a still image according to the related art.

FIG. 20 is a block diagram for describing an image processing device 200 according to the present embodiment. As shown in FIG. 20, the image processing device 200 according to the present embodiment includes compression/decompression processing unit 201, detection processing unit 202, image processing unit 203, resolution conversion processing unit 204, display controller 205, display unit 206, hard disk drive (hereafter, referred to as HDD) 207, operating unit 208, media drive 211, external interface 212, external input/output terminal 213, communication interface 214, transmission/reception antenna 215, thumbnail raw moving image generating unit 221, thumbnail intermediate development moving image generating unit 222, thumbnail ordinary moving image generating unit 223, and control unit 230.

The control unit 230 is for controlling the respective units of the image processing device according to the present embodiment, and is a microcomputer configured of a CPU (Central Processing Unit) 231, ROM (Read Only Memory) 232, RAM (Random Access Memory) 233, and EEPROM (Electrically Erasable and Programmable ROM) 234 which are connected thereto through a CPU bus 235.

The CPU 231 reads out and executes various types of programs stored and held in later-described ROM 232, receives supply of information from the respective units as necessary, and forms a control signal to be supplied to the respective units to supply this to the respective units, i.e., the CPU 231 serves as the core of control with the image processing device 200 according to the present embodiment.

As described above, the ROM 232 stores and holds data necessary for various programs and processing executed by the CPU 231. Also, the RAM 233 temporarily stores the results in the middle of processing with various types of processing, i.e., the ROM 232 is principally employed as a work area.

Also, the EEPROM 234 is so-called nonvolatile memory, e.g., stores and holds various types of data which needs to be held even if the power of the image processing unit 200 according to the present embodiment is turned off, for example, such as various processing results, setting parameters, a program provided for function enhancement, and so forth.

The compression/decompression processing unit 201 performs compression processing and decompression processing of image data. For example, in a case wherein image data provided from an external device through the later-described external input/output terminal 213 and external interface 212 is not data subjected to data compression, the function of the compression/decompression processing unit 201 enables the image data to be subjected to compression processing, and to be recorded in the hard disk of the HDD 207. Also, for example, in a case wherein the moving image data recorded in the hard disk of the HDD 207 is data subjected to data compression, when reading out and playing this, the function of the compression/decompression processing unit 201 enables the moving image data to be subjected to decompression processing, and to be played.

Also, the detection processing unit 202 is configured in the same way as with the detection processing unit 402 of the camera system 100 shown in FIG. 1, and in response to supply of raw moving image data, subjects the raw moving image data to detection processing for each frame to generate detection data, and generates a development parameter group from the generated detection data for each frame. For example, even in the case of raw moving image data alone being supplied, the detection processing unit 202 can generate a development parameter group based on the raw moving image data, and can perform development processing suitably.

The image processing unit 203 is configured in the same way as with the image processing unit 403 of the camera system 100 shown in FIG. 1, and in response to supply of raw moving image data and development parameter group, subjects the raw moving image data to development processing such as exposure adjustment processing, white balance adjustment processing, demosaic processing, saturation adjustment processing, color tone adjustment processing, and so forth to form and output YC data. For example, of a series of development processing, the display processing unit 203 can performs, for example, development processing of exposure adjustment processing, white balance adjustment processing, and demosaic processing to form and output intermediate development moving image data.

The resolution conversion processing unit 204 is configured in the same way as with the resolution conversion processing unit 404 of the camera system 100 shown in FIG. 1, and subjects the supplied YC data to image scaling processing to form and output image data for display.

In response to supply of image data for display from the resolution conversion processing unit 404, the display controller 205 forms an image signal having a format to be supplied to the display unit 206 from the image data for display, and supplies this to the display unit 206. The display unit 206 includes a display device, for example, such as LCD (Liquid Crystal Display), organic electroluminescence panel, CRT (Cathode Ray Tube), or the like, and in response to supply of an image signal from the display controller 205, displays the moving image corresponding to this image signal on the display screen of its own display device.

Also, the HDD 207 includes, for example, a hard disk of relatively large capacity in the order of hundreds of gigabytes or greater, and according to the control of the control unit 230, can record various types of supplied data in the hard disk, and read out data recorded in the hard disk.

The operating unit 208 includes various types of operating keys, and in response to input of instructions from the user, can supply this to the control unit 230 as an electric signal. Thus, the control unit 230 controls the respective units according to input of instructions from the user, and allows the user to perform desired processing.

The thumbnail raw moving image generating unit 221 is configured in the same way as with the thumbnail raw moving image generating unit 421 of the camera system 100 shown in FIG. 1, and for example, in response to supply of raw moving image data from the detection processing unit 202 or the like, generates thumbnail raw moving image data.

Also, for example, in response to supply of intermediate development moving image data from the image processing unit 203 or the like, the thumbnail intermediate development moving image generating unit 222 generates thumbnail intermediate development moving image data. Also, for example, in response to supply of moving image data for display from the resolution conversion processing unit 204, the thumbnail ordinary moving image generating unit 223 generates thumbnail ordinary moving image data.

The image processing device 200 according to the present embodiment includes three input/output terminal units, i.e., a media drive 211, external interface 212 and input/output terminal 213, and communication interface 214 and transmission/reception antenna 215.

The media drive 211 is capable of mounting/detaching of a removable medium, and can read out data from a removable medium mounted thereon, and write data to the removable medium. Accordingly, a recording medium which is a removable medium in which raw image data has been recorded by the camera system is mounted on the media drive 211, whereby the control unit 230 of the image processing device 200 according to the present embodiment can read out and use raw image data or the like recorded in the removable medium.

Note that there are various types of removable medium, such as a memory card, optical disc, magneto-optical disk, magnetic disk, and so forth, but the media drive 211 of the image processing device 100 according to the first embodiment is, for example, a removable medium for memory card.

The external interface 212 and input/output terminal 213 are a digital interface, for example, such as USB (Universal Serial Bus) standard, IEEE (Institute of Electrical and Electronics Engineers, Inc) 1394 standard, or the like, whereby an external device including the same digital interface can be connected thereto.

Therefore, an external device such as a camera system storing and holding raw image data and so forth is connected through the external interface 212 and input/output terminal 213, whereby the control unit 230 of the image processing device 200 according to the present embodiment can receive and use the raw image data stored and held in the external device.

The communication interface 214 and transmission/reception antenna 215 enables transmission/reception of information with an external device through a wide area network, for example, such as the Internet or the like. Accordingly, communication processing is performed with an external device such as a camera system or mobile terminal having a communication function and holding raw image data and so forth through the communication interface 214 and transmission/reception antenna 215, whereby the control unit 230 can obtain and use raw image data or the like.

Thus, the image processing device 200 according to the present embodiment obtains by shooting a moving image with the camera system 100 shown in FIG. 1, and obtains raw image data or the like recorded in the recording medium 109 through the media drive 211 serving as a unit for accepting raw image data or the like, external interface 212 and input/output terminal 213, and communication interface 214 and transmission/reception antenna 215 as described with reference to FIGS. 2, 3, and 7, whereby the obtained raw image data or the like can be subjected to development processing or the like under the control of the control unit 230.

Next, the development processing performed at the image processing device 200 will be described specifically. Description will be made here as an example regarding a case wherein a moving image is shot by the camera system shown in FIG. 1, whereby a raw moving image file having a format shown in FIG. 2 is recorded in a recording medium 109, and the recording medium 109 is mounted on the media drive 211 shown in FIG. 20, and employed.

First, description will be made regarding a case wherein the raw moving image data S1 recorded in the recording medium 109 mounted on the media drive 211 is played. In this case, the same processing as the processing of the flowchart shown in FIG. 19 described as the operation of the camera system 100 is performed. Description will be made here with reference to FIG. 19.

Upon playback of the raw moving image data S1 recorded in the recording medium 109 mounted on the media drive 211 being instructed through the operating unit 208, the control unit 230 executes processing shown in FIG. 19, controls the media drive 211 to read out the target raw moving image data S1, and development parameter group Pm, and supplies these to the image processing unit 203 (step S201).

Subsequently, under the control of the control unit 230, the image processing unit 203 performs interpolation processing of the development parameter group Pm supplied thereto, and processing for adjusting a development parameter according to input of modification instructions as to the development parameter group from the user accepted through the operating unit 208 (step S202).

Subsequently, the image processing unit 203 performs development processing of the read raw moving image data using the development parameter after interpolation and adjustment to generate YC data (step S203). The YC data generated here is supplied to the resolution conversion processing unit 204, where the YC data is subjected to resolution conversion to generate image data for display, and this is supplied to the display controller 205, where an image signal having a format to be supplied to the display unit 206 is formed, and this is supplied to the display unit 206, where the moving image corresponding to the read raw moving image data is played on the display screen of the display unit 206 (step S204).

Subsequently, the control unit 230 determines whether or not an event for ending the playback processing has occurred, such as playback end instructions of raw moving image data through the operating unit 208, completion of playback of the raw moving image data instructed to play, or the like (step S205).

In a case wherein determination is made in step S205 that an event for ending the playback processing has not occurred, the control unit 230 repeats the processing from step S201, and continues the playback processing. Also, in a case wherein determination is made in step S205 that an event for ending the playback processing has occurred, the processing shown in FIG. 19 ends.

Thus, development processing can be performed at the image processing device 200 using the raw moving image data S1 and development parameter group Pm imaged at the camera system 100 and recorded in the recording medium 109, and the moving image after the development processing can be displayed on the display screen of the display device of the display unit 206, and can be used.

Thus, with the camera system 100 according to the present embodiment, the raw moving image data S1 and development parameter group Pm obtained by shooting are employed, whereby the raw moving image data can be subjected to development processing, and played. Also, the development parameter group is adjusted, whereby the user can perform desired picture-making.

Note that FIG. 19 is a diagram for describing a case wherein the raw moving image data S1 is played, but in the case of playing the thumbnail raw moving image data Sn1 as well, the same playback processing is performed. Also, the intermediate development moving image data S2 and thumbnail intermediate development moving image data Sn2 can be played by the playback processing in accordance with the flowchart shown in FIG. 19.

However, in the case of the intermediate development moving image data S2 and thumbnail intermediate development moving image data Sn2, the development processing performed in step S203 is not development processing to be performed first but development processing to be performed later. That is to say, as described above, the intermediate development moving image data according to the present embodiment is formed by exposure adjustment processing, white balance adjustment processing, NR processing, and interpolation processing (demosaic processing) being performed, so the subsequent saturation adjustment processing and color tone adjustment processing are performed here. Of course, this is an example, so various patterns can be conceived.

The playback processing other than the raw moving image data S1 performed at the image processing device 200 according to the present embodiment will be summarized briefly below. First, description will be made a case wherein the thumbnail raw moving image data Sn1 recorded in the recording medium 109 mounted on the media drive 211 is played.

Upon playback of the thumbnail raw moving image data Sn1 recorded in the recording medium 109 mounted on the media drive 211 being instructed through the operating unit 208, the control unit 230 controls the media drive 211 read out the target thumbnail raw moving image data Sn1 and development parameter group Pm, and supplies these to the image processing unit 203.

Subsequently, in the same way as with the case of subjecting raw moving image data to development processing, the image processing unit 203 performs development processing using thumbnail raw moving image data Sn1 and development parameter Pm. In this case, upon modification of the development parameter group Pm being instructed from the user through the operating unit 208, the control unit 230 supplies the instruction information thereof to the image processing unit 203, whereby the development parameter group Pm can be modified.

Accordingly, the user can modify the development parameter group Pm, and also can subject the thumbnail raw moving image data Sn1 to development so as to obtain the user's desired image. Subsequently, in the case of the thumbnail raw moving image data Sn1 as well, the thumbnail raw moving image data Sn1 is subjected to development processing at the image processing unit 203 to generate YC data, and this is subjected to scale conversion at the resolution conversion processing unit 204 to form thumbnail image data for display, and this is supplied to the controller 205.

The display controller 205 forms a thumbnail image signal having a format to be supplied to the display unit 206 from the thumbnail image data for display supplied thereto, and supplies this to the display unit 206. Thus, the moving image data corresponding to the thumbnail raw moving image data Sn1 is displayed on the display screen of the display device of the display unit 206.

Thus, in the case of the raw moving image data S1 and thumbnail raw moving image data Sn1, according to the development parameter Pm, or the development parameter Pm modified by the user as necessary, the development processing is performed from the beginning thereof to form moving image data of image quality according to the user's predilection, whereby this can be played and used.

Next, description will be made regarding a case wherein the intermediate development moving image data S2 recorded in the recording medium 109 mounted on the media drive 211 is played. Upon playback of the intermediate development moving image data S2 recorded in the recording medium 109 mounted on the media drive 211 being instructed through the operating unit 208, the control unit 230 controls the media drive 211 to read out the target intermediate development moving image data S2, and development parameter group Pm, and supplies these to the image processing unit 203.

The image processing unit 203 subjects the intermediate development moving image data S2 supplied thereto to the development processing after the development processing which has already been performed using the development parameter Pm supplied thereto to form YC data. At this time, in the case of accepting input of modification instructions of the development parameter group Pm regarding the development processing after the development processing which has already been performed through the operating unit 208, the control unit 230 supplies this to the image processing unit 203, where the development parameter group Pm can also be modified.

Thus, the intermediate development moving image data S2 is employed, whereby the development processing after the development processing which has already been performed can be repeated without repeating the development processing which has already been performed as to the intermediate development moving image data S2. Accordingly, the remaining development processing can be repeated by repeatedly modifying the parameter regarding the development processing after the development processing which has already been performed.

Thus, the user can subject the intermediate development moving image data S2 to development processing by modifying the parameter regarding the development processing after the development processing which has already been performed so as to obtain an image of image quality of the User's predilection. Also, the modification of the development parameter Pm in this case is as to the development processing after the development processing which has already been performed, the development processing to be performed after the development processing which has already been performed can be performed repeatedly by changing the development parameter while maintaining validity regarding the development processing which has already been performed.

The subsequent processing is similar to that in the case of the above-mentioned raw moving image data S1, wherein the YC data formed at the image processing unit 203 is supplied to the resolution conversion processing unit 204, where the YC data is subjected to image scaling processing to form image data for display. The image data for display formed at the resolution conversion processing unit 204 is supplied to the display controller 205, where an image signal having a format to be supplied to the display unit 206 is formed, and this is supplied to the display unit 206.

Thus, development processing is performed at the image processing device 200 using the intermediate development moving image data S2 and development parameter group Pm imaged at the camera system 100 and recorded in the recording medium 109, whereby the moving image after the development processing can be played and used.

Next, description will be made regarding a case wherein the thumbnail intermediate development moving image data Sn2 recorded in the recording medium 109 mounted on the media drive 211 is played. Upon playback of the thumbnail intermediate development moving image data Sn2 recorded in the recording medium 109 mounted on the media drive 211 being instructed through the operating unit 208, the control unit 230 controls the media drive 211 to read out the target thumbnail intermediate development moving image data Sn2, and development parameter group Pm, and supplies these to the image processing unit 203.

Subsequently, in the same way as with the case of subjecting the intermediate development moving image data to development processing, the image processing unit 203 subjects the thumbnail intermediate development moving image data Sn2 to the development processing after the development processing which has already been performed using the development parameter Pm to form YC data. At this time, in the case of accepting input of modification instructions of the development parameter group Pm regarding the development processing after the development processing which has already been performed through the operating unit 208, the control unit 230 supplies this to the image processing unit 203, where the development parameter group Pm can also be modified.

Accordingly, the user can also subject the thumbnail intermediate development moving image data Sn2 to development by changing the development parameter group Pm so as to obtain an image of image quality according to the user's predilection. Subsequently, in the case of the thumbnail intermediate development moving image data Sn2 as well, the thumbnail intermediate development moving image data Sn2 is subjected to development processing at the image processing unit 203, thereby forming YC data, and this is subjected to scale conversion at the resolution conversion processing unit 204 to form thumbnail image data for display, and this is supplied to the display controller 205.

The display controller 205 forms a thumbnail image signal having a format to be supplied to the display unit 206 from the thumbnail image data for display supplied thereto, and supplies this to the display unit 206. Thus, the moving image data corresponding to the thumbnail intermediate development moving image data Sn2 is displayed on the display screen of the display device of the display unit 206.

Therefore, the thumbnail intermediate development moving image data Sn2 is employed, whereby the development processing after the development processing which has already been performed can be repeated without repeating the development processing which has already been performed as to the thumbnail intermediate development moving image data Sn2. Accordingly, the remaining development processing can be repeated by repeatedly modifying the parameter regarding the development processing after the development processing which has already been performed. Moreover, in the case of the thumbnail intermediate development moving image data Sn2, the data amount thereof is smaller than that of the ordinary intermediate development moving image data S2, whereby the thumbnail intermediate development moving image data Sn2 can be subjected to development processing rapidly, played, and the content thereof can be confirmed.

Note that in a case wherein the raw moving image data S1, thumbnail raw moving image data Sn1, intermediate development moving image data S2, and thumbnail intermediate development moving image data Sn2 are moving image data subjected to data compression, the development parameter Pm is supplied to the image processing unit 203, but the raw moving image data S1, thumbnail raw moving image data Sn1, intermediate development moving image data S2, and thumbnail intermediate development moving image data Sn2 which have been subjected data compression are supplied to the compression/decompression processing unit 201.

Subsequently, such moving image data is subjected to decompression processing at the compression/decompression processing unit 201, thereby restoring such moving image data to the raw moving image data S1, thumbnail raw moving image data Sn1, intermediate development moving image data S2, and thumbnail intermediate development moving image data Sn2 before data compression, and the raw moving image data S1, thumbnail raw moving image data Sn1, intermediate development moving image data S2, and thumbnail intermediate development moving image data Sn2 after restoration are supplied to the image processing unit 203.

Thus, with regard to the raw moving image data S1, thumbnail raw moving image data Sn1, intermediate development moving image data S2, and thumbnail intermediate development moving image data Sn2 as well, the image processing device according to the present embodiment subjects such moving image data to decompression processing and then development processing, whereby such moving image data can be played suitably.

Next, description will be made regarding a case wherein the ordinary moving image data S3 recorded in the recording medium 109 mounted on the media drive 211 is played. Upon playback of the ordinary moving image data S3 recorded in the recording medium 109 mounted on the media drive 211 being instructed through the operating unit 208, the control unit 230 controls the media drive 211 to read out the target ordinary moving image data, and supplies this to the compression/decompression processing unit 201. As described above, this is because the ordinary moving image data has been subjected to data compression and recorded in the recording medium 109.

The compression/decompression processing unit 201 subjects the ordinary moving image data supplied thereto to decompression processing to restore image data for display before data compression, and supplies this to the display controller 205. As described above, the display controller 205 forms a moving image signal having a format to be supplied to the display unit 206 from the image data for display supplied thereto, and supplies this to the display unit 206. Thus, the moving image corresponding to the ordinary moving image data read out from the recording medium 109 is displayed on the display screen of the display device of the display unit 206.

Also, playback of the thumbnail ordinary moving image data Sn3 recorded in the recording medium 109 mounted on the media drive 211 can be performed in the same way as with the case of the above-mentioned ordinary moving image data S3. That is to say, upon playback of the thumbnail ordinary moving image data Sn3 recorded in the recording medium 109 mounted on the media drive 211 being instructed through the operating unit 208, the control unit 230 controls the media drive 211 to read out the target thumbnail ordinary moving image data.

In a case wherein the read thumbnail ordinary moving image data Sn3 is moving image data subjected to data compression, the control unit 230 supplies the thumbnail ordinary moving image data Sn3 to the compression/decompression processing unit 201, and supplies the original thumbnail moving image data for display before data compression which has been subjected to decompression processing and restored, to the display controller 205. Also, in a case wherein the read thumbnail ordinary moving image data Sn3 is moving image data not subjected to data compression, i.e., in the case of thumbnail moving image data for display, the control unit 230 supplies this to the display controller 205 as is.

Subsequently, the display controller 205 forms a thumbnail moving image signal having a format to be supplied to the display unit 206 from the thumbnail moving image data for display supplied thereto, and supplies this to the display unit 206. Thus, the thumbnail moving image corresponding to the thumbnail ordinary moving image data Sn3 read out from the recording medium 109 is displayed on the display screen of the display device of the display unit 206.

Thus, in response to supply of the raw moving image data S1, intermediate development moving image data S2, ordinary moving image data S3, thumbnail raw moving image data Sn1, thumbnail intermediate development moving image data Sn2, and thumbnail ordinary moving image data Sn3 obtained by shooting at the camera system 100, the image processing device 200 according to the present embodiment subjects the raw moving image data S1, intermediate development moving image data S2, thumbnail raw moving image data Sn1, and thumbnail intermediate development moving image data Sn2 to development processing, whereby such moving image data can be played and used.

Thus, the image processing device 200 according to the present embodiment can subject any of the raw moving image data S1, thumbnail raw moving image data Sn1, intermediate development moving image data S2, and thumbnail intermediate development moving image data Sn2 recorded in the recording medium 109 by the camera system 100 to development processing suitably, whereby such moving image data can be played. Also, the image processing device 200 according to the present embodiment can also play the ordinary moving image data S3 and thumbnail ordinary moving image data Sn3.

Also, description has been made here regarding the case of playing the moving image data recorded in the recording medium 109 as an example, but the present invention is not restricted to this, the raw moving image data S1, thumbnail raw moving image data Sn1, intermediate development moving image data S2, thumbnail intermediate development moving image data Sn2, ordinary moving image data S3, and thumbnail ordinary moving image data Sn3 supplied from an external device such as a camera system connected through the external interface 212 and external input/output terminal 213 can also be processed and played in the same way as with the processing at the time of playback from the recording medium 109.

Also, the raw moving image data S1, thumbnail raw moving image data Sn1, intermediate development moving image data S2, thumbnail intermediate development moving image data Sn2, ordinary moving image data S3, and thumbnail ordinary moving image data Sn3 received from an external device through the communication interface 214 and transmission/reception antenna 215 can also be processed and played in the same way as with the processing at the time of playback from the recording medium 109.

Also, the detection processing unit 202 also includes the thumbnail raw moving image generating unit 221, thumbnail intermediate development moving image generating unit 222, and thumbnail ordinary moving image generating unit 223, so an arrangement may be made wherein, in response to supply of the raw moving image data S1 alone, the image processing device 200 subjects this to detection processing, development processing, resolution conversion processing, thumbnail raw moving image generation processing, thumbnail intermediate development moving image generation processing, and thumbnail ordinary moving image generation processing to generate raw moving image data S1, thumbnail raw moving image data Sn1, intermediate development moving image data S2, thumbnail intermediate development moving image data Sn2, ordinary moving image data S3, and thumbnail ordinary moving image data Sn3, records these in the hard disk of the HDD 207, whereby the user can use these.

Advantages, Etc. of Embodiment

With the camera system 100 according to the above-mentioned embodiment, as described with reference to FIG. 4, a development parameter needs to be added to discontinuous frames in an adaptive manner without adding a development parameter to all of the frames, whereby the data amount of development parameters to be recorded can be reduced as much as possible.

Also, raw moving image data itself can be subjected to data compression, whereby the data amount of the raw moving image data can also be reduced.

Also, thumbnail raw moving image data and thumbnail intermediate development moving image are generated and recorded, or thumbnail moving image data and thumbnail intermediate development moving image are generated at the development apparatus, thereby realizing high-speed development, and accordingly, the burden of the user can be reduced markedly.

Also, adjustment is performed so as to generate an adaptive development parameter from change in development parameters and detection values, thereby reducing the capacity of the development parameters, and further, interpolation processing of development parameters is performed in combination with a key frame for adjusting development parameters added by the user, whereby suitable development adjustment can be performed simply in an intuitive manner.

Also, as described above, intermediate development moving image data and thumbnail intermediate development moving image data can be generated and recorded in the recording medium by the camera system (imaging apparatus), but can also be generated when the development apparatus saves the read raw moving image file again.

Also, with the camera system 100 according to the above-mentioned embodiment, an arrangement has been made wherein of raw moving image data, a development parameter is added to predetermined discontinuous frames with a certain interval, and also added to a change point where an image, development parameter, or detection data drastically changes, but the present invention is not restricted to this.

An arrangement may be made wherein a development parameter is added to only predetermined discontinuous frames with a certain interval, or only a change point where an image, development parameter, or detection data drastically changes. In the latter case, there is a need to detect an image change point by monitoring at least one of raw moving image data, detection data from the detection processing unit 402, and development parameter from the detection processing unit 402, and add a development parameter to the frame of the detected change point.

Note however, a scene change point can be detected by analyzing raw moving image data, and a change point where image quality greatly changes can be detected by analyzing detection data and development parameters, so these are employed in a combination manner, whereby an image change point can be detected suitably, and also a frame to which a development parameter is to be added can be determined suitably.

CONCLUSION

As can be understood from the above-mentioned embodiment, a moving image raw format capable holding all or any combination of raw moving image data (raw original signal), intermediate development moving image data, thumbnail raw moving image data, thumbnail intermediate development moving image data, ordinary moving image data (developed moving image signal), thumbnail ordinary moving image data (developed moving image thumbnail signal), and a parameter group necessary for developing those, and an development apparatus for realizing this, and an imaging apparatus for outputting this can be realized.

Also, raw moving image data, i.e., moving image raw data wherein multiple pixels are continuously formed in the temporal axis direction is subjected to lossless compression or lossy compression to form compressed moving image raw data, a moving image raw data format holding singular or a plurality of compressed moving image raw data, a development apparatus for developing this format, and an imaging apparatus for outputting this format can be realized. The term "singular or a plurality of" mentioned here means different raw moving image data (e.g., raw moving image data shot at the time of a child's athletic meet, raw moving image data shot on a vacation, etc.) and a plurality of different raw moving image data.

Also, with a series of raw moving image data, a moving image raw format capable of recording information determining a frame or frame group to which a development parameter is added, development apparatus for developing this format, and imaging apparatus for outputting this format can be realized.

Also, as described above, with a raw moving image format holding raw moving image data (raw moving image signal) from the imaging device, a moving image raw format capable holding a development parameter group as not to all of the frames but as to a certain interval, changeover of a scene, a scene change point, a change point of detection results, or the like in an adaptive manner, a circuit and module for performing this, development apparatus for developing this format, and imaging apparatus for outputting this format can be realized.

Also, with a raw moving image format holding raw moving image data from the imaging device, a moving image raw format not recording all of the development parameters simultaneously, but recording a development parameter at different timing depending on the change frequency of the development parameter, development apparatus for developing this format, and imaging apparatus for outputting this format can be realized.

Also, a moving image raw format capable of recording multiple development parameter sets to the same frame simultaneously, development apparatus for developing this format, and imaging apparatus for outputting this format can be realized.

Also, a development apparatus capable reading in raw moving image data, and also outputting a file after modification can be realized.

Also, a development apparatus for suitably interpolating development parameters recorded in an adaptive manner, and performing development using these parameters can be realized.

Also, a moving image raw development apparatus for performing development while changing development parameters smoothly in the temporal axis direction by interpolating a development parameter of which the key frame is specified by the user between frames in addition to development parameters recorded in the recording medium along with raw moving image data, and a raw moving image format capable of recording the information thereof can be realized.

Other

Note that the camera system 100 according to the above-described embodiment is a so-called digital video camera, which is carried and used by a common user, but the present invention is not restricted to this. Moving image transmission with a monitoring camera can be exemplified as a use example of the above-described raw moving image data (raw moving image format).

At present a monitoring camera transmits data of development results using in accordance with data transmission band limit. However, a mechanism for performing development is costly, which does not necessarily need to be included in the camera. If data transmission speed permits, raw moving image data is transmitted, development can be performed as necessary at transmission destination, for example, by employing the image processing device shown in FIG. 20. Thus, a development mechanism can be omitted from the monitoring camera, whereby great reduction in cost can be realized.

Also, even in the case of performing transmission over a network, a format will always exist, and it is necessary to define this format. Accordingly, employing the raw moving image format described with the camera system 100 according to the above-described embodiment enables exchange of raw moving image data through a network to be handled sufficiently.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing device comprising:
circuitry configured to
receive a supply of raw moving image data that have not yet been subjected to development processing including white balance processing;
generate a development parameter, based upon the raw moving image data that have not yet been subjected to development processing including white balance processing, that is used in development processing including white balance processing on the raw moving image data that have not yet been subjected to development processing including white balance processing as to a plurality of discontinuous frames with a predetermined certain interval of said raw moving image data, wherein
the plurality of discontinuous frames with the predetermined certain interval of said raw moving image data includes a first discontinuous frame adjacent to a first predetermined certain interval of said raw moving image data, a second discontinuous frame adjacent to the first predetermined certain interval of said raw moving image data and a second predetermined certain interval of said raw moving image data, and a third discontinuous frame adjacent to the second predetermined certain interval of said raw moving image data,
the first predetermined certain interval and the second first predetermined certain interval are the same,
the development parameter is generated, based upon the raw moving image data, for the first discontinuous frame, the second discontinuous frame, and the third discontinuous frame, and
the development parameter is not generated, based upon the raw moving image data, for a frame of said raw moving image data positioned within the first predetermined certain interval or positioned within the second first predetermined certain interval;

perform control to record said raw moving image data and said development parameter for the first discontinuous frame, the second discontinuous frame, and the third discontinuous frame in a predetermined recording medium in correlation with each; and generate the development parameter for the frame of said raw moving image data positioned within the first predetermined certain interval or positioned within the second first predetermined certain interval based upon the generated development parameter for at least one of the first discontinuous frame, the second discontinuous frame, and the third discontinuous frame as read from the predetermined recording medium.

2. The image processing device according to claim 1, wherein the circuitry is configured to generate thumbnail raw moving image data, which is reduction image data from said raw moving image data;

subject said raw moving image data to development processing up to a predetermined stage to generate intermediate development moving image data;

generate thumbnail intermediate development moving image data, which is reduction image data from said intermediate development moving image data;

subject said raw moving image data to development to generate developed ordinary moving image data;

generate thumbnail ordinary moving image data, which is reduction image data from said developed ordinary moving image data; and record, in addition to said raw moving image data and said development parameter for the first discontinuous frame, the second discontinuous frame, and the third discontinuous frame, said thumbnail intermediate development moving image data, said intermediate development moving image data, said thumbnail intermediate development moving image data, said developed ordinary moving image data, and said thumbnail ordinary moving image data in said predetermined recording medium.

3. The image processing device according to claim 1, wherein the circuitry is configured to subject said raw moving image data to data compression processing; and record said raw moving image data subjected to data compression in said predetermined recording medium.

4. The image processing device according to claim 1, wherein the circuitry is configured to record said development parameter for the first discontinuous frame, the second discontinuous frame, and the third discontinuous frame, to which information determining a frame or frame group of said raw moving image data to be applied is arranged to be added, in said predetermined recording medium.

5. The image processing device according to claim 1, wherein the circuitry is configured to read out said raw moving image data and said development parameter from said predetermined recording medium;

subject said read out raw moving image data to development processing up to a predetermined stage or a final stage using said read out development parameter; and output intermediate development moving image data or ordinary development moving image data based on the development processing.

6. The image processing device according to claim 1, which is configured as an imaging apparatus, further comprising:

imaging circuitry configured to capture a moving image of a subject, and output said raw moving image data, which is moving image data in the undeveloped state corresponding thereto.

7. The image processing device according to claim 1, wherein the circuitry is configured to generate detection data, which has an evaluation value for subjecting said raw moving image data to detection processing, and subjecting said raw moving image data to image processing, in increments of frames;

generate said development parameter as to the discontinuous frames with the predetermined certain interval of said raw moving image data based on said detection data;

analyze at least one of said raw moving image data, said detection data, and said development parameter as to the discontinuous frame with the predetermined certain interval; and generate a development parameter at a moving image change point based on said raw moving image data.

8. The image processing device according to claim 7, wherein the circuitry is configured to set said predetermined certain interval of said raw moving data to be smaller when said development parameter has a high change frequency or to be greater when said development parameter has a low change frequency.

9. The image processing device according to claim 7, wherein the circuitry is configured to generate a plurality of development parameters for a group of said discontinuous frames with the predetermined certain interval of said raw moving image data.

10. The image processing device according to claim 7, wherein the circuitry is configured to read out said raw moving image data and said development parameter from said predetermined recording medium;

generate a deficient development parameter based on said read out development parameter;

subject said read out raw moving image data to development processing up to a predetermined stage or a final stage using an interpolated and adjusted development parameter; and output intermediate development moving image data or ordinary development moving image data based on the development processing.

11. The image processing device according to claim 7, wherein the circuitry is configured to read out said raw moving image data and said development parameter from said predetermined recording medium;

subject said read out development parameter to editing in response to input of any of development parameter addition, elimination, and modification instructions from a user;

generate a deficient development parameter based on said edited development parameter;

subject said read out raw moving image data to development processing up to a predetermined stage or a final stage using an interpolated and adjusted development parameter; and output intermediate development moving image data or ordinary development moving image data based on the development processing.

12. A development apparatus for receiving a supply of raw moving image data that have not yet been subjected to development processing including white balance processing, and a development parameter, generated based upon the raw moving image data that have not yet been subjected to development processing including white balance processing, that is used in development processing including white balance processing on the raw moving image data that have not yet been subjected to development processing including white balance processing generated as to a plurality of discontinuous frames with a predetermined certain interval of said raw moving image data, the plurality of discontinuous frames with the predetermined certain interval of said raw moving image data including a first discontinuous frame adjacent to a first predetermined certain interval of said raw moving image data, a second discontinuous frame adjacent to the first predetermined certain interval of said raw moving image data and a second predetermined certain interval of said raw moving image data, and a third discontinuous frame adjacent to the second predetermined certain interval of said raw moving image data, the first predetermined certain interval and the second first predetermined certain interval being the same, the development parameter having been generated for the first discontinuous frame, the second discontinuous frame, and the third discontinuous frame, and the development parameter not having been generated for a frame of said raw moving image data positioned within the first predetermined certain interval or positioned within the second first predetermined certain interval, to perform development processing, the development apparatus comprising:

circuitry configured to generate the development parameter for the frame of said raw moving image data positioned within the first predetermined certain interval or positioned within the second first predetermined certain interval based upon the generated development parameter for at least one of the first discontinuous frame, the second discontinuous frame, and the third discontinuous frame;

subject said raw moving image data to development processing up to a predetermined stage or a final stage using said development parameter; and output intermediate development moving image data or ordinary development moving image data based on the development processing.

13. The development apparatus according to claim 12, wherein said development parameter having been generated for the discontinuous frames is a development parameter to be added to the discontinuous frames with the predetermined certain interval of said raw moving image data, and wherein the circuitry is configured to generate a deficient development parameter based on said development parameter generated for the discontinuous frames by interpolation processing said development parameter generated for the discontinuous frames; and subject said raw moving image data to development processing up to the predetermined stage or the final stage using said development parameter subjected to interpolation processing.

14. The development apparatus according to claim 12, wherein said development parameter having been generated for the discontinuous frames is a development parameter to be added to the discontinuous frames with the predetermined certain interval of said raw moving image data, and wherein the circuitry is configured to subject said development parameter generated for the discontinuous frames to editing in response to input of any of development parameter addition, elimination, and modification instructions from a user;

generate a deficient development parameter based on said edited development parameter by interpolation processing said edited development parameter; and subject said raw moving image data to development processing up to the predetermined stage or the final stage using said edited development parameter subjected to interpolation processing.

15. An image processing method employed for an image processing device for recording image data in a predetermined recording medium, said image processing device executing the image processing method comprising:

generating, using processing circuitry, in response to a supply of raw moving image data that have not yet been subjected to development processing including white balance processing, a development parameter, based upon the raw moving image data that have not yet been subjected to development processing including white balance processing, that is used in development processing including white balance processing on the raw moving image data that have not yet been subjected to development processing including white balance processing as to a discontinuous frame with a predetermined certain interval of said raw moving image data, wherein the plurality of discontinuous frames with the predetermined certain interval of said raw moving image data includes a first discontinuous frame adjacent to a first predetermined certain interval of said raw moving image data, a second discontinuous frame adjacent to the first predetermined certain interval of said raw moving image data and a second predetermined certain interval of said raw moving image data, and a third discontinuous frame adjacent to the second predetermined certain interval of said raw moving image data, the first predetermined certain interval and the second first predetermined certain interval are the same, the development parameter is generated, based upon the raw moving image data, for the first discontinuous frame, the second discontinuous frame, and the third discontinuous frame, and the development parameter is not generated, based upon the raw moving image data, for a frame of said raw moving image data positioned within the first predetermined certain interval or positioned within the second first predetermined certain interval;

performing control, using the processing circuitry, so as to record said raw moving image data and said development parameter generated in said generating for the first discontinuous frame, the second discontinuous frame, and the third discontinuous frame in a predetermined recording medium in correlation with each other; and generating, using the processing circuitry, the development parameter for the frame of said raw moving image data positioned within the first predetermined certain interval or positioned within the second first predetermined certain interval based upon the generated development parameter for at least one of the first discontinuous frame, the second discontinuous frame, and the third discontinuous frame as read from the predetermined recording medium.

16. The image processing method according to claim 15, wherein said generating said development parameter includes:

generating detection data, which has an evaluation value for subjecting said raw moving image data to detection processing, and subjecting said raw moving image data to image processing, in increments of frames, generating said development parameter as to the discontinuous frames with the predetermined certain interval of said raw moving image data based on said detection data, and analyzing at least one of said raw moving image data, said detection data, and said development parameter to generate a development parameter at a moving image change point according to said raw moving image data.

17. The image processing method according to claim 16, wherein, for said generating said development parameter, setting said predetermined certain interval of said raw moving data to be smaller when said development parameter has a high change frequency or to be greater when said development parameter has a low change frequency.

18. The image processing method according to claim 16, wherein, for said generating said development parameter, a plurality of development parameters are generated for a group of said discontinuous frames with the predetermined certain interval of said raw moving image data.

19. The image processing method according to claim 15, further comprising at least one of:

generating a thumbnail raw moving image data, which is reduction image data from said raw moving image data;

subjecting said raw moving image data to development processing up to a predetermined stage to generate intermediate development moving image data;

generating thumbnail intermediate development moving image data, which is reduction image data from said intermediate development moving image data;

subjecting said raw moving image data to development processing to generate developed ordinary moving image data; and generating thumbnail ordinary moving image data, which is reduction image data from said developed ordinary moving image data, wherein, for said performing control so as to record said raw moving image data and said development parameter, control is performed so as to record, in addition to said raw moving image data and said development parameter for the first discontinuous frame, the second discontinuous frame, and the third discontinuous frame, said thumbnail raw moving image data, said intermediate development moving image data, said thumbnail intermediate development moving image data, said developed ordinary moving image data, and said thumbnail ordinary moving image data in said predetermined recording medium.

20. A development method employed for a development apparatus for performing development processing in response to a supply of raw moving image data that have not yet been subjected to development processing including white balance processing, and a development parameter, generated based upon the raw moving image data that have not yet been subjected to development processing including white balance processing, that is used in development processing including white balance processing on the raw moving image data that have not yet been subjected to development processing including white balance processing generated as to a plurality of discontinuous frames with a predetermined certain interval of said raw moving image data, the plurality of discontinuous frames with the predetermined certain interval of said raw moving image data including a first discontinuous frame adjacent to a first predetermined certain interval of said raw moving image data, a second discontinuous frame adjacent to the first predetermined certain interval of said raw moving image data and a second predetermined certain interval of said raw moving image data, and a third discontinuous frame adjacent to the second predetermined certain interval of said raw moving image data, the first predetermined certain interval and the second first predetermined certain interval being the same, the development parameter having been generated for the first discontinuous frame, the second discontinuous frame, and the third discontinuous frame, and the development parameter not having been generated for a frame of said raw moving image data positioned within the first predetermined certain interval or positioned within the second first predetermined certain interval, wherein said development apparatus executes the development method comprising:

generating, using a processor, the development parameter for the frame of said raw moving image data positioned within the first predetermined certain interval or positioned within the second first predetermined certain interval based upon the generated development parameter for at least one of the first discontinuous frame, the second discontinuous frame, and the third discontinuous frame;

subjecting, using the processor, said raw moving image data to development processing up to a predetermined stage or a final stage using said development parameter; and outputting, using the processor, intermediate development moving image data or ordinary development moving image data processed in the development processing.

21. The development method according to claim 20, wherein said development parameter having been generated for the discontinuous frames is a development parameter to be added to the discontinuous frames with the predetermined certain interval of said raw moving image data, wherein the development method further comprises:

generating a deficient development parameter based on said development parameter generated for the discontinuous frames by interpolation processing said development parameter generated for the discontinuous frames, and wherein, in the development processing, said raw moving image data is subjected to development processing up to the predetermined stage or the final stage using said development parameter subjected to interpolation processing.

22. The development method according to claim 20, wherein said development parameter having been generated for the discontinuous frames is a development parameter to be added to the discontinuous frame with the predetermined certain interval of said raw moving image data, wherein the development method further comprises:

subjecting said development parameter generated for the discontinuous frames to editing in response to input of any of development parameter addition, elimination, and modification instructions from a user; and generating a deficient development parameter based on said edited development parameter, by interpolation processing said edited development parameter, and wherein, in the development processing, said raw moving image data is subjected to development processing up to the predetermined stage or the final stage using said edited development parameter subjected to interpolation processing.

23. A non-transitory computer-readable storage medium storing an image processing program, which, when executed using a computer of an image processing device for recording image data in a predetermined recording medium, causes said computer of said image processing device to execute a method comprising:

generating, in response to a supply of raw moving image data that have not yet been subjected to development processing including white balance processing, a development parameter, based upon the raw moving image data that have not yet been subjected to development processing including white balance processing, that is used in development processing including white balance processing on the raw moving image data that have not yet been subjected to development processing including white balance processing as to a discontinuous frame with a predetermined certain interval of said raw moving image data, wherein the plurality of discontinuous frames with the predetermined certain interval of said raw moving image data includes a first discontinuous frame adjacent to a first predetermined certain interval of said raw moving image data, a second discontinuous frame adjacent to the first predetermined certain interval of said raw moving image data and a second predetermined certain interval of said raw moving image data, and a third discontinuous frame adjacent to the second predetermined certain interval of said raw moving image data, the first predetermined certain interval and the second first predetermined certain interval are the same, the development parameter is generated, based upon the raw moving image data, for the first discontinuous frame, the second discontinuous frame, and the third discontinuous frame, and the development parameter is not generated, based upon the raw moving image data, for a frame of said raw moving image data positioned within the first predetermined certain interval or positioned within the second first predetermined certain interval;

performing control so as to record said raw moving image data, and said development parameter for the first discontinuous frame, the second discontinuous frame, and the third discontinuous frame in a predetermined recording medium in correlation with each other; and generating the development parameter for the frame of said raw moving image data positioned within the first predetermined certain interval or positioned within the second first predetermined certain interval based upon the generated development parameter for at least one of the first discontinuous frame, the second discontinuous frame, and the third discontinuous frame as read from the predetermined recording medium.

24. The non-transitory computer-readable storage medium according to claim 23, further comprising at least one of:

generating a thumbnail raw moving image data, which is reduction image data from said raw moving image data;

subjecting said raw moving image data to development processing up to a predetermined stage to generate intermediate development moving image data;

generating thumbnail intermediate development moving image data, which is reduction image data from said intermediate development moving image data;

subjecting said raw moving image data to development processing to generate developed ordinary moving image data; and generating thumbnail ordinary moving image data, which is reduction image data from said developed ordinary moving image data, wherein, for said performing control so as to record said raw moving image data and said development parameter, control is performed so as to record, in addition to said raw moving image data and said development parameter for the first discontinuous frame, the second discontinuous frame, and the third discontinuous frame, said thumbnail raw moving image data, said intermediate development moving image data, said thumbnail intermediate development moving image data, said developed ordinary moving image data, and said thumbnail ordinary moving image data in said predetermined recording medium.

25. The non-transitory computer-readable storage medium according to claim 23, wherein said generating the development parameter includes:

generating detection data, which is an evaluation value for subjecting said raw moving image data to detection processing, and subjecting said raw moving image data to image processing, in increments of frames, generating said development parameter as to the discontinuous frames with the predetermined certain interval of said raw moving image data based on said detection data, and analyzing at least one of said raw moving image data, said detection data, and said development parameter to generate a development parameter at a moving image change point according to said raw moving image data.

26. The non-transitory computer-readable storage medium according to claim 25, wherein, for said generating the development parameter, setting said predetermined certain interval of said raw moving data to be smaller when said development parameter has a high change frequency or to be greater when said development parameter has a low change frequency.

27. The non-transitory computer-readable storage medium according to claim 25, wherein, for said generating the development parameter, a plurality of development parameters are generated for a group of said discontinuous frames with the predetermined certain interval of said raw moving image data.

28. A non-transitory computer-readable storage medium storing a development program, which, when executed using a computer of a development apparatus for performing development processing in response to a supply of raw moving image data that have not yet been subjected to development processing including white balance processing, and a development parameter, generated based upon the raw moving image data that have not yet been subjected to development processing including white balance processing, that is used in development processing including white balance processing on the raw moving image data that have not yet been subjected to development processing including white balance processing generated as to a plurality of discontinuous frames with a predetermined certain interval of said raw moving image data, the plurality of discontinuous frames with the predetermined certain interval of said raw moving image data including a first discontinuous frame adjacent to a first predetermined certain interval of said raw moving image data, a second discontinuous frame adjacent to the first predetermined certain interval of said raw moving image data and a second predetermined certain interval of said raw moving image data, and a third discontinuous frame adjacent to the second predetermined certain interval of said raw moving image data, the first predetermined certain interval and the second first predetermined certain interval being the same, the development parameter having been generated for the first discontinuous frame, the second discontinuous frame, and the third discontinuous frame, and the development parameter not having been generated for a frame of said raw moving image data positioned within the first predetermined certain interval or positioned within the second first predetermined certain interval, causes said computer of said development apparatus to execute a method comprising:

generating the development parameter for the frame of said raw moving image data positioned within the first predetermined certain interval or positioned within the second first predetermined certain interval based upon the generated development parameter for at least one of the first discontinuous frame, the second discontinuous frame, and the third discontinuous frame;

subjecting said raw moving image data to development processing up to a predetermined stage or a final stage using said development parameter; and outputting intermediate development moving image data or ordinary development moving image data processed in the development processing.

29. The non-transitory computer-readable storage medium according to claim 28, wherein said development parameter having been generated for the discontinuous frames is a development parameter to be added to the discontinuous frame with the predetermined certain interval of said raw moving image data, wherein the method further comprises:

generating a deficient development parameter based on said development parameter generated for the discontinuous frames, by interpolation processing said development parameter generated for the discontinuous frames, and wherein, in the development processing, said raw moving image data is subjected to development processing up to the predetermined stage or the final stage using said development parameter subjected to interpolation processing.

30. The non-transitory computer-readable storage medium according to claim 28, wherein said development parameter having been generated for the discontinuous frames is a development parameter to be added to the discontinuous frame with the predetermined certain interval of said raw moving image data, wherein the method further comprises:

subjecting said development parameter generated for the discontinuous frames to editing in response to input of any of development parameter addition, elimination, and modification instructions from a user; and generating a deficient development parameter based on said edited development parameter by interpolation processing said edited development parameter, and wherein, in the development processing, said raw moving image data is subjected to development processing up to the predetermined stage or the final stage using said edited development parameter subjected to interpolation processing.

* * * * *